Feb. 23, 1971   W. J. MIDDLETON, JR   3,564,826
ARTICLE HANDLING APPARATUS
Filed April 21, 1969   16 Sheets-Sheet 1

INVENTOR.
WILLIAM J. MIDDLETON, JR.

Feb. 23, 1971  W. J. MIDDLETON, JR  3,564,826
ARTICLE HANDLING APPARATUS
Filed April 21, 1969  16 Sheets-Sheet 2
FIG IA
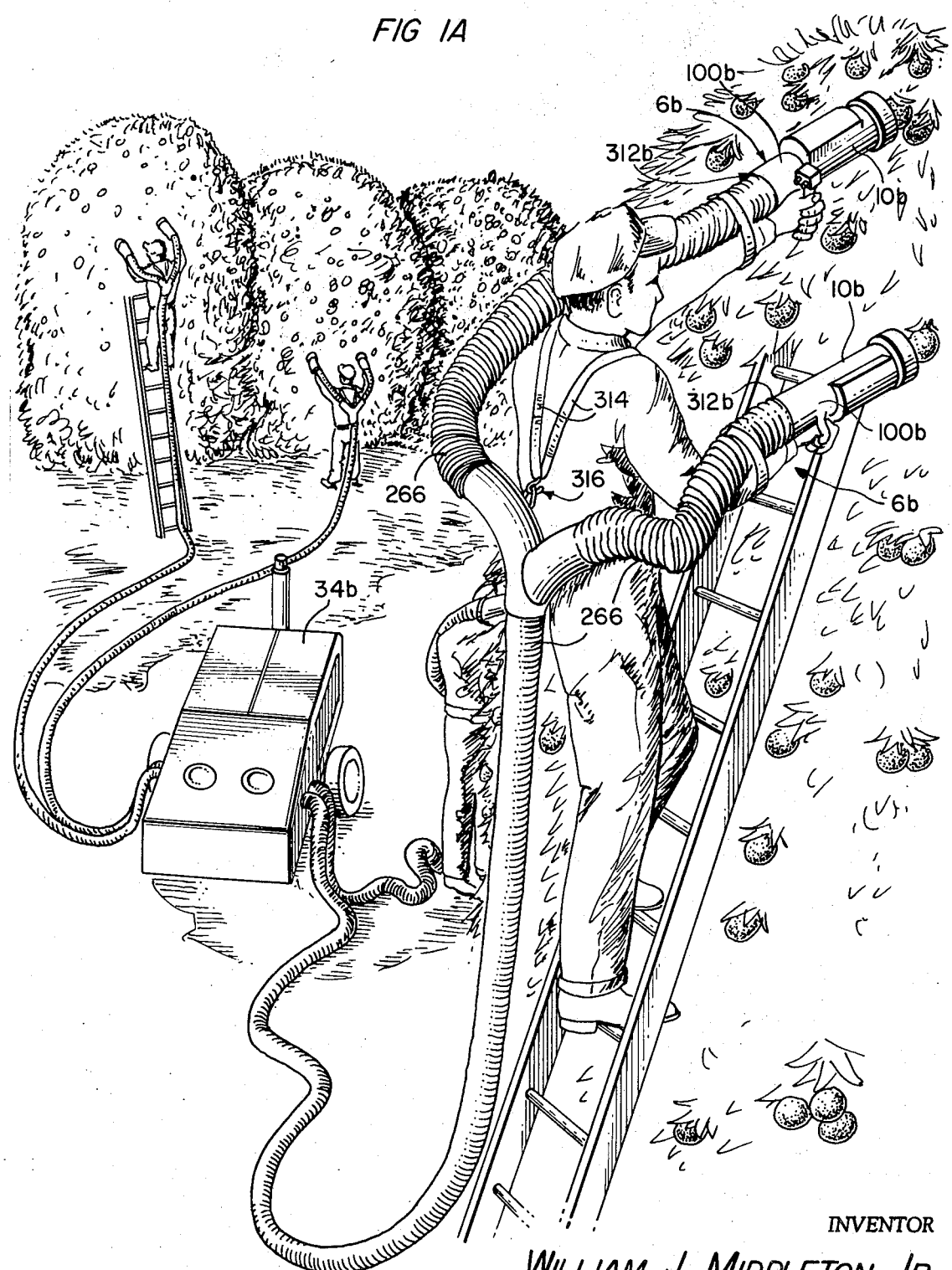
INVENTOR
WILLIAM J. MIDDLETON, JR.

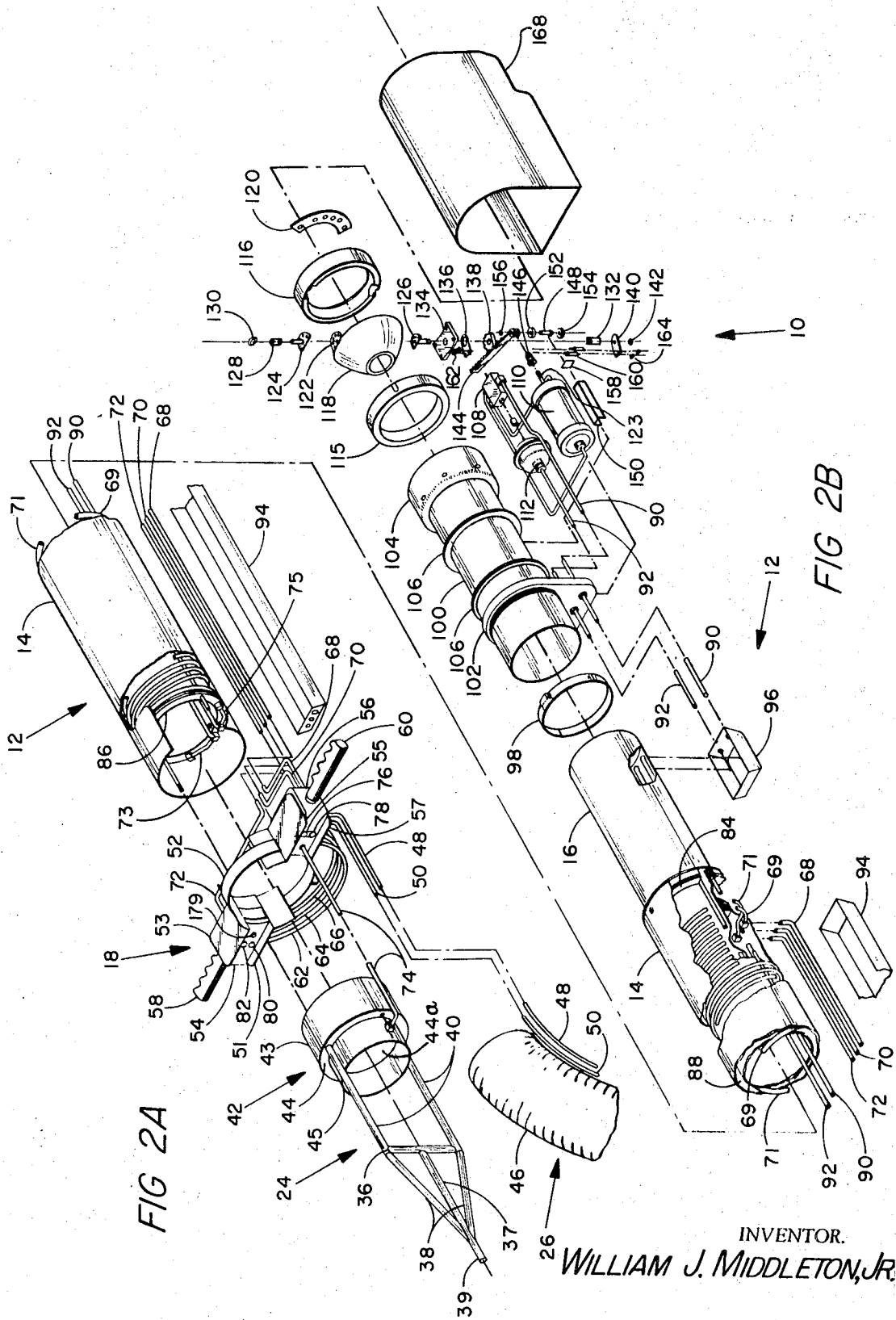

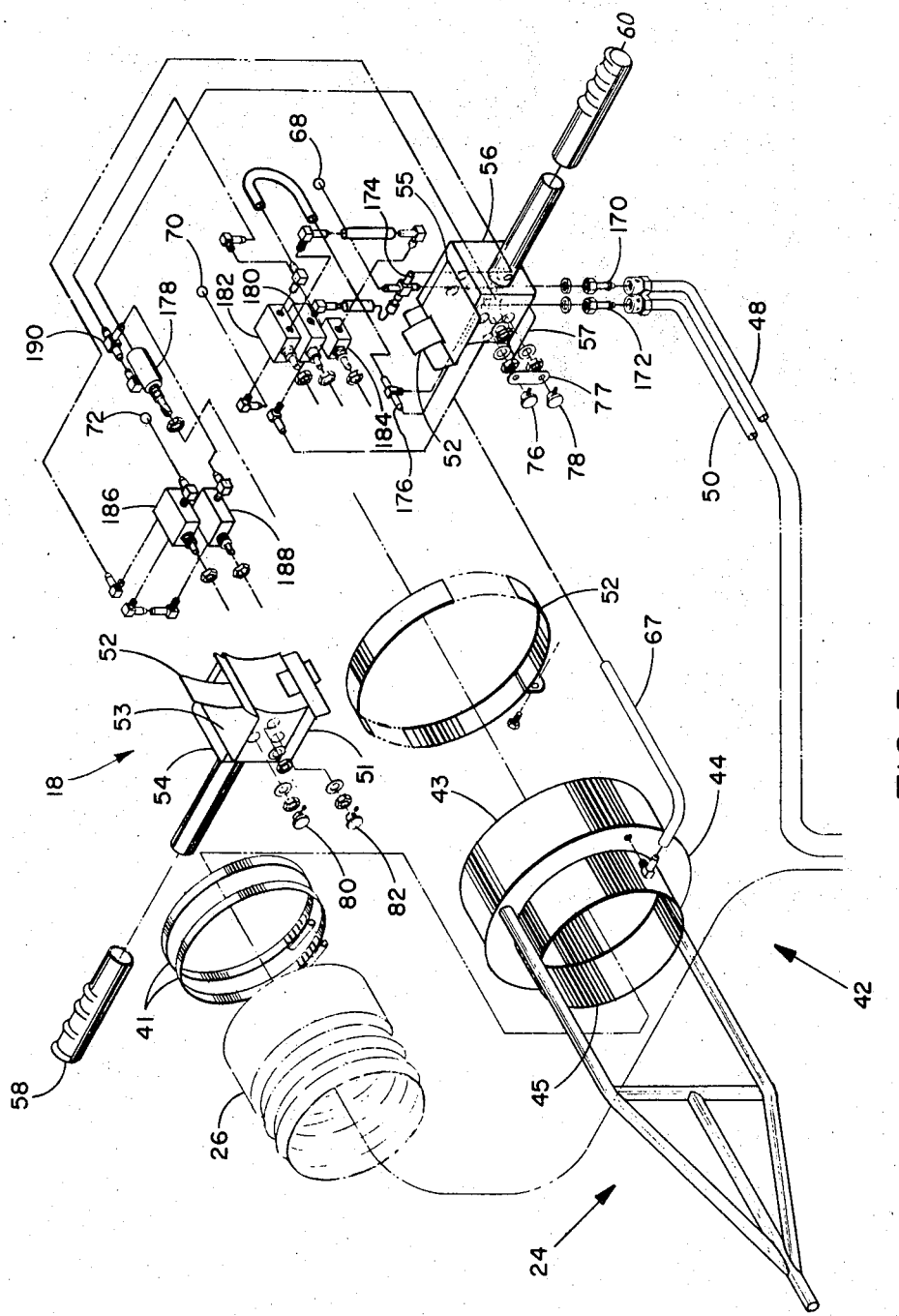

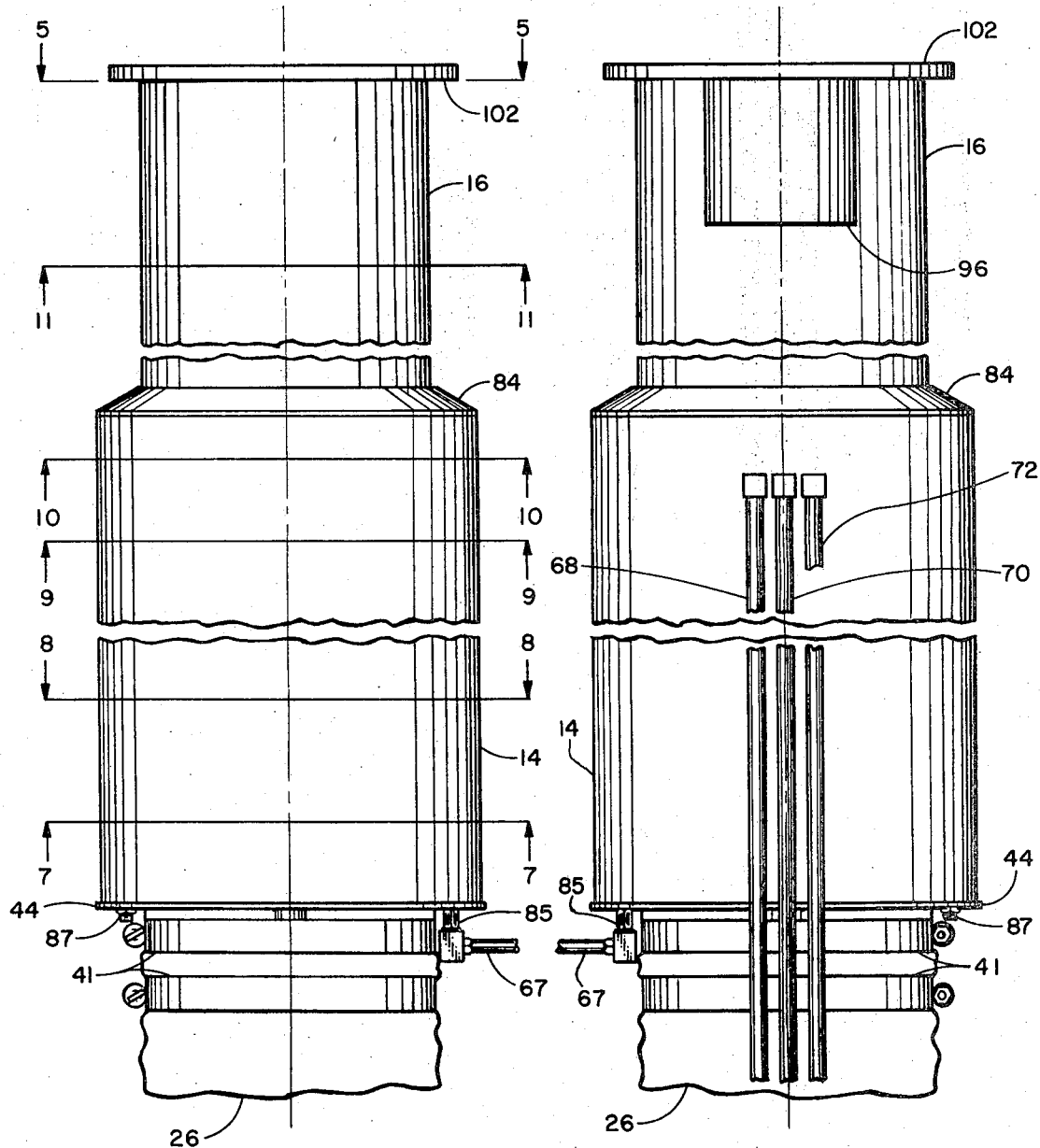

INVENTOR.
WILLIAM J. MIDDLETON, JR.

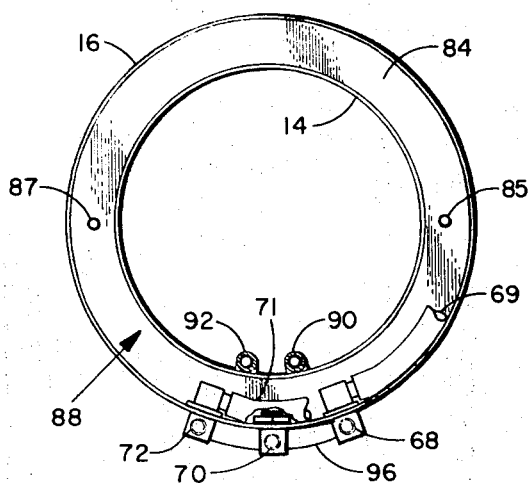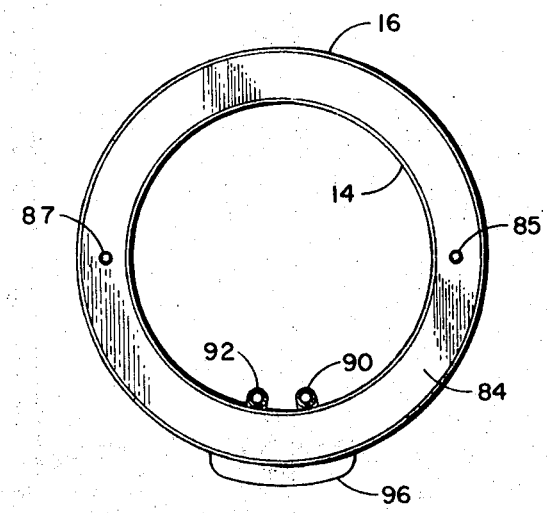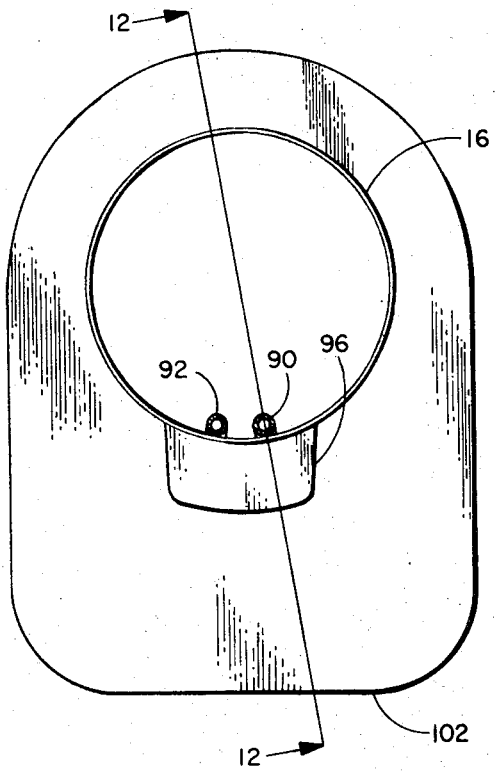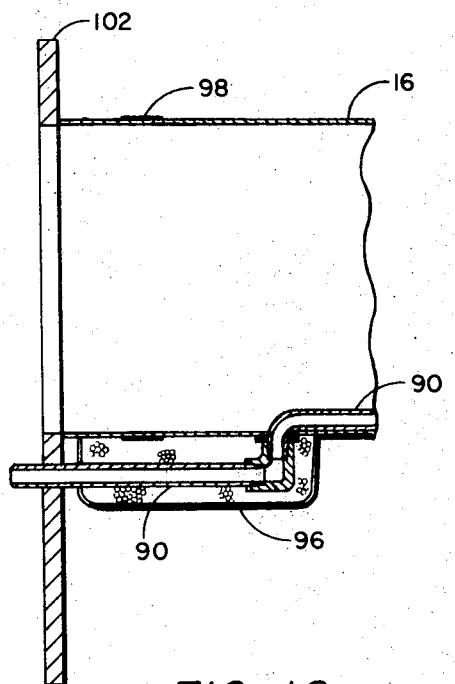

INVENTOR.
WILLIAM J. MIDDLETON, JR.

Feb. 23, 1971   W. J. MIDDLETON, JR   3,564,826
ARTICLE HANDLING APPARATUS
Filed April 21, 1969   16 Sheets-Sheet 11

INVENTOR.
WILLIAM J. MIDDLETON, JR.

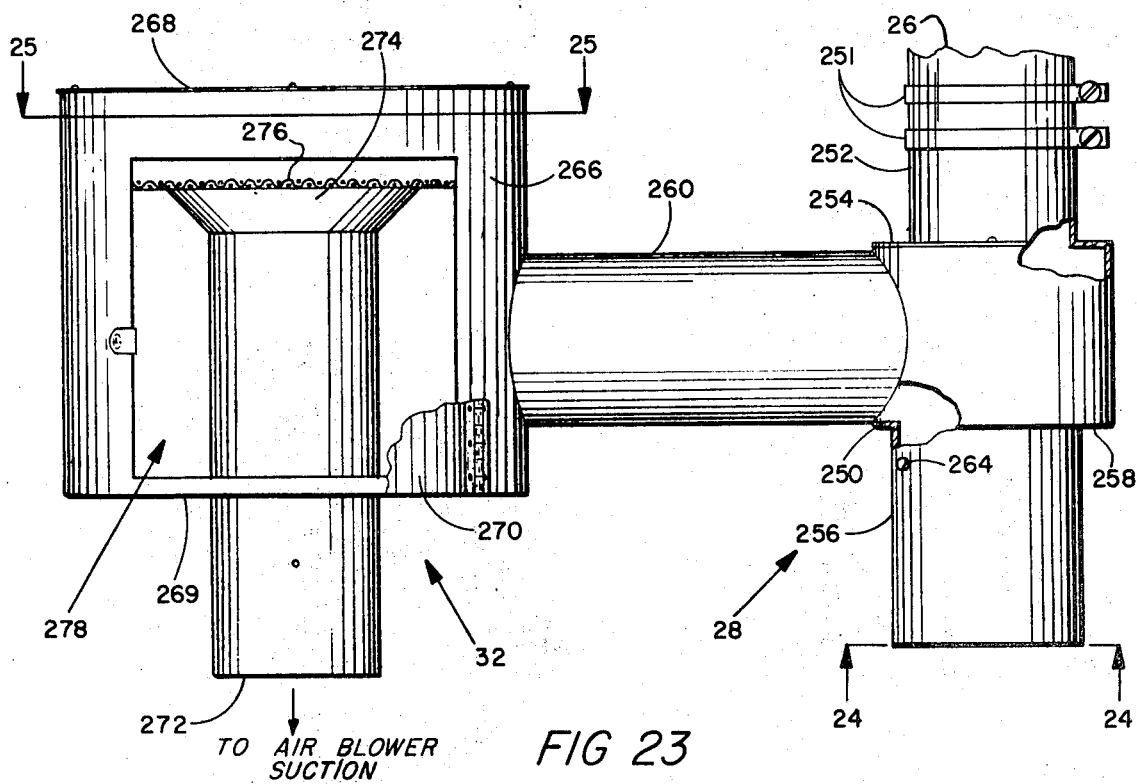
FIG 23
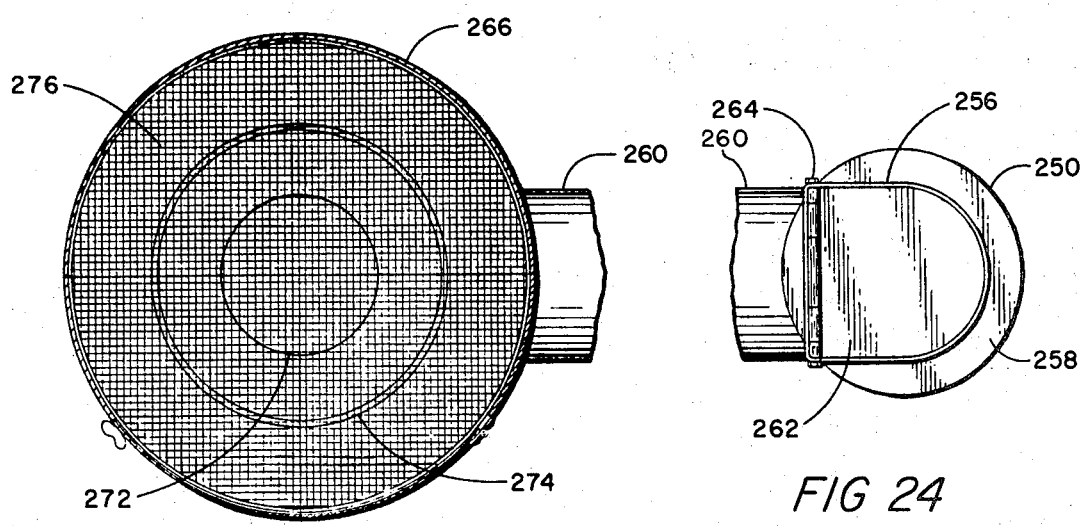
FIG 25
FIG 24
INVENTOR.
WILLIAM J. MIDDLETON, JR.

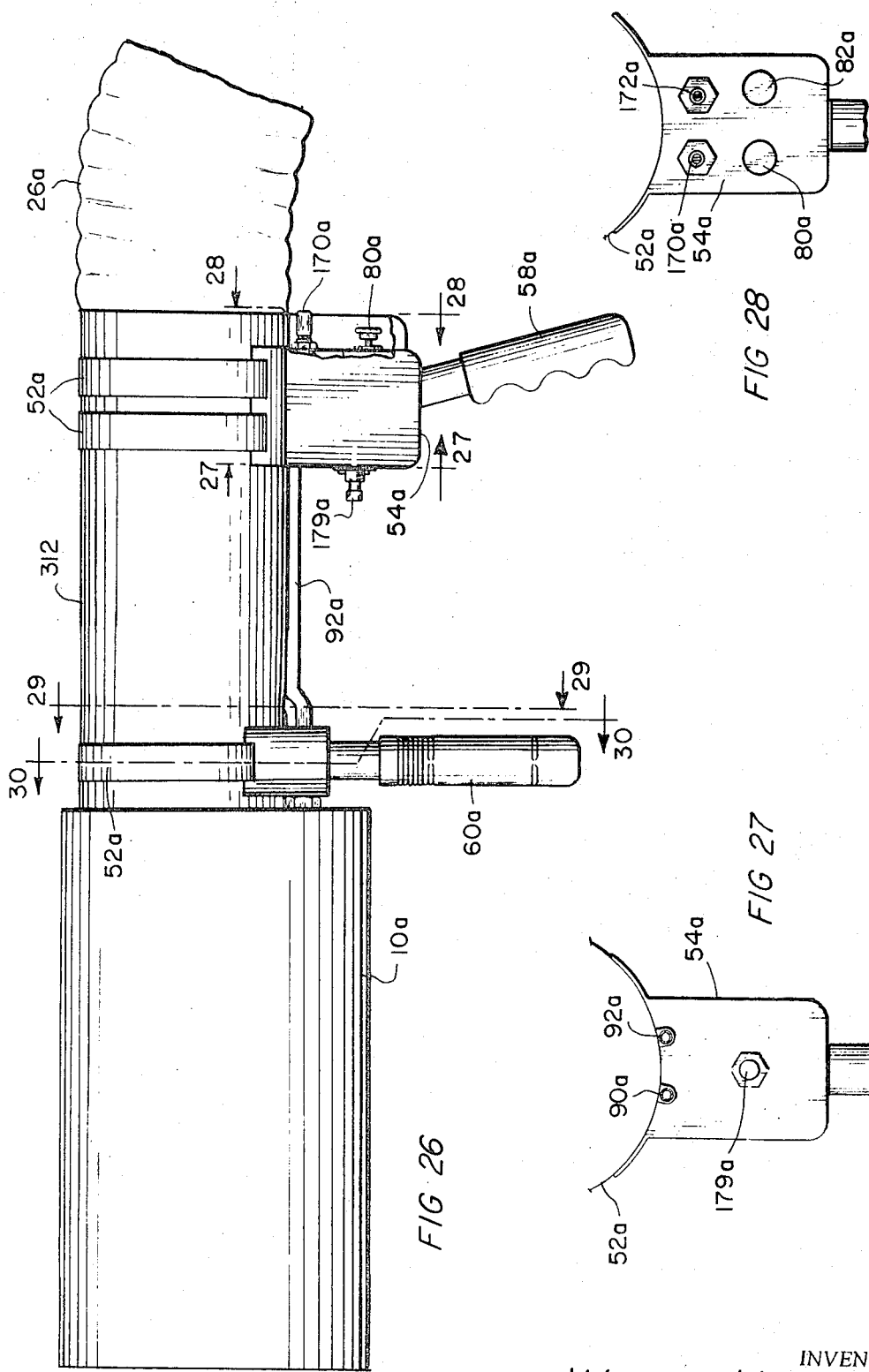

Feb. 23, 1971　　　W. J. MIDDLETON, JR　　　3,564,826
ARTICLE HANDLING APPARATUS

Filed April 21, 1969　　　　　　　　　　　　16 Sheets-Sheet 15

INVENTOR.
WILLIAM J. MIDDLETON, JR.

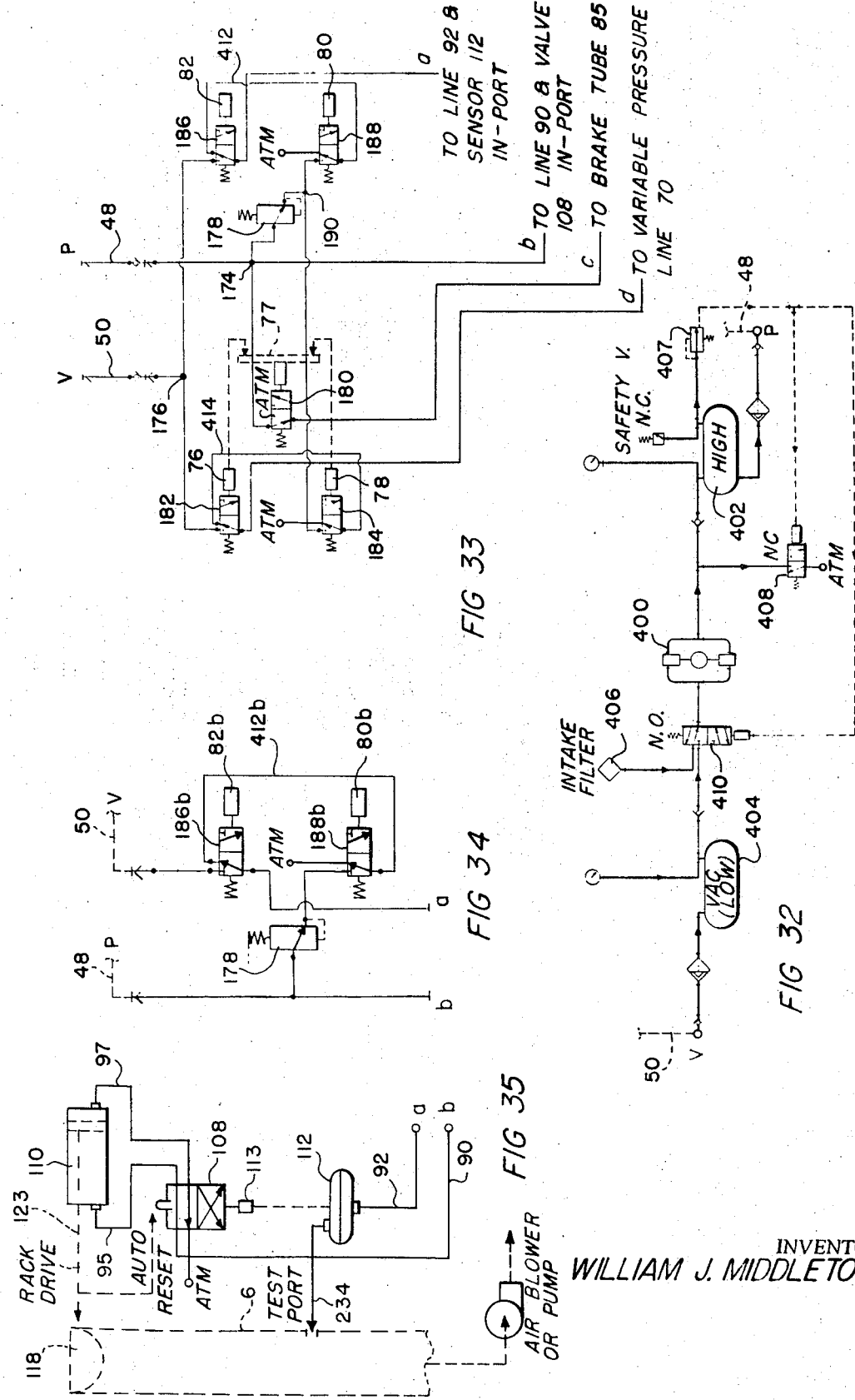

United States Patent Office 3,564,826
Patented Feb. 23, 1971

3,564,826
ARTICLE HANDLING APPARATUS
William J. Middleton, Jr., Felton, Del., assignor to ILC Industries, Inc., Dover, Del., a corporation of Delaware
Filed Apr. 21, 1969, Ser. No. 817,910
Int. Cl. A01g 19/08
U.S. Cl. 56—328
50 Claims

ABSTRACT OF THE DISCLOSURE

A pneumatic article handling apparatus for gathering and conveying articles such as fruit. The apparatus automatically removes the articles such as fruit from its natural habitat and conveys it to a collector.

BACKGROUND OF THE INVENTION

This invention is particularly related to the harvesting of fruit and to mechanical/pneumatic harvesting systems and apparatus in which when fruit to be harvested by the device is in a pre-determined position that creates a desired detectable condition which is detected by a condition sensing device which in turn commences a harvesting cycle thereby removing fruit from its natural habitat.

An article of fruit as disclosed and claimed in this application means in general and is inclusive of any material object or product of plant growth that is useful to man, and particularly covers the edible and more or less succulent product of plant growth including those commonly understood as fruits, vegetables, nuts and the like.

The preferred embodiment of this invention is primarily directed toward the harvesting of roughly round fleshy fruit such as citrus. It is to be understood, however, that this apparatus including its harvesting mechanism containing the picking head of this invention will pick fruit of various shapes and types with the necessary change in configuration depending on the shape of the fruit.

In the fruit growing industry in many parts of the world, the possibility of a shortage or unavailability of agricultural labor during harvest time raises the problem of possible escalated labor costs, labor logistic problems, or in some cases partial or full loss of a crop since its economical harvesting may depend on a somewhat unpredictable, relatively critical onset of the time for harvesting or length of the harvest period. This is more apparent when the normally occurring changes in weather including sometimes drastic temperature rises and drops are understood in the effects on fruits maturation and need to harvest. The practice of field laborers leaving less accessible fruit on the trees in order to increase their total production can also result in loss to the grower through lower yields and fruit left on the trees may eventuate in damage to the trees.

A need has thus existed for better means to assist the agricultural worker and particularly the pickers in the citrus groves to rapidly harvest greater quantities of fruit in good condition per unit time and obtain all or most of the hard-to-get-at fruit that is out of reach, especially that which is high up, and often left unpicked by piece-rate workers.

Increased fruit acreage, increased fruit yield per acre and closer planting of fruit trees are a few additional reasons why improved and more efficient fruit harvesting machines and techniques are needed so that the amount of actually harvested fruit is closer to the amount of fruit available for harvest.

A number of objections regarding performance, damage to trees, damage to fruit harvested, and equipment cost are applicable to prior known fruit harvesting mechanisms such as tree-shakers, air-blast devices and comb type harvesters. These and other presently known mechanized fruit harvesters including reach rod with cutter head types, although useful in some respects, have not as yet fully solved the problems of the presently often slow, ineffective or inefficient fruit harvesting. The present invention provides the picker or worker in the groves with an efficient mechanized harvester apparatus that he can effectively control to rapidly and automatically remove a maximum of fruit from its natural habitat at a relatively high picking or fruit removal rate and low labor costs per box of fruit harvested without significant damage to the harvested fruit.

SUMMARY OF THE INVENTION

This invention is a fruit detecting harvester apparatus which rapidly and automatically removes fruit from its growth source with minimum damage to the fruit being harvested. In at least one embodiment the harvester or harvesting appaartus of this invention has a detector for sensing the presence of fruit and inter alia, manually controlled range, elevation, and azimuth adjustability of the means for picking or removing the fruit and for selecting a maximum of fruit to be harvested, such as that which is beyond easy reach of the operator. The apparatus provides the capability of continuous automatic removing of successive articles of fruit from trees, for example, and conveying them away from the habitat or growth source, and the apparatus operator and collecting the fruit at a remote location.

This novel harvester apparatus has a fruit harvesting mechanism or picking head for removing the fruit from its growth source which includes a device for sensing a fluid pressure condition and a fruit removing device so that when the fruit to be harvested is in a pre-determined position relative to the harvester the condition sensing device detects a changed pressure condition and automatically actuates the mechanism to automatically pick or remove the fruit without damage to it and the apparatus then collects the fruit by gravity and air movement while maintaining it in good market condition. After the picking of the fruit it is rapidly and automatically conveyed to a fruit collector remote from the operator or worker and loose foliage separated out. The harvesting mechanism of the apparatus may be advantageously controlled by pneumatic fluid pressure devices which automatically reset the mechanism after picking so that it is in condition to repeat its fruit seeking, removing, conveying and collecting cycle of operation in a continuous successive manner.

One preferred embodiment of this novel fruit harvester apparatus includes, in structurally cooperative combination; a fruit harvesting mechanism having a fluid controlled fruit removing device and an atmospheric condition sensing device that senses a predetermined position of the fruit with respect to the fruit harvesting mechanism; a fruit collector; an extender mechanism that has one of its ends connected to the fruit harvesting mechanism and its other end connected to the fruit collector; and an air removing means connected to the extender mechanism that forces air through the extender mechanism. When the fruit to be harvested is in a predetermined position with respect to the fruit harvesting mechanism, it is gathered into the apparatus and when in position for severance of the stem causes a drop in pressure and the condition sensing device detects this condition and actuates the fruit removing device by change in fluid pressures controlling operation of the harvesting mechanism. The fruit is then rapidly and automatically removed from its natural habitat and the flow of air produced by the air moving means propels the removed fruit by the flow and the pressure differential set up thereby, and/or gravity, through a tube-like picking means supporting the picking head and through the extender mechanism to the fruit collector.

The fruit harvest apparatus heretofore described, has a picking means in the form of a tube that may be extensible for receiving and transporting fruit picked from its growth source. The end of the picking means has an opening therein large enough to receive the maximum size fruit to be picked and also contains therein a cup-like arrangement which has a small opening therein defined by a circular rim so that when fruit is seated in the cup-like arrangement, air flowing in the tube from the atmosphere is cut off. The opening defined by the circular rim, of course, is smaller in diameter than a diameter of the fruit to be picked. This allows for a closing off of the air being drawn into the tube because of partial vacuum connected with the interior of the tube when a piece of fruit is sucked into the cup-like arrangement and seated over this opening. When the seating occurs, there is, of course, an immediate drop in pressure in the tube near the cup-like arrangement.

Note that the vacuum at the inside of the tube does several things:

(1) It snugs the fruit up against the rim when you have positioned the cup approximately at the piece of fruit.

(2) It serves as a signaling means, which can be at the same time an actuating means as follows: When the piece of fruit has been snugged against the rim, the flow of air into the end of the tube is then much reduced and a pressure drop is automatically created inside the tube below the fruit and this pressure drop serves to tell the sensing or actuating means that the fruit is in position to be picked.

(3) This same vacuum serves to transport the fruit along the tube after it has been picked. (This is helpful in some attitudes of the tube and is essential in other attitudes of the tube such for example as when it is pointed somewhat down). Note that there are other possible ways of snugging the fruit into its exact picking position, and there are other ways of sensing that the fruit is in that position, and there are other ways of transporting it along inside the tube, but the use of this vacuum to do all three of these things is uniquely optimum.

A feature which is advantageous independently, and is particularly adapted to the combination with this vacuum setup, is that the rim-cup structure is:

(1) at least partially self-positioning in that the fruit comes into sort of the bottom of a bowl, where it will naturally come to rest by geometry as well as by suction.

(2) The rotation of the rim-cup member is the rotation of a particular spherical shell about a generally spherical object, and the two are roughly concentric, so this rotation can have considerable mechanical motion without interference from the fruit.

Next, tie in with that the fact that the stem is the only thing that the cup cannot easily rotate around, and it pinches the stem and scissors it against the tube end.

Note also that the suction holds the fruit stationary relative to the cup, so the fruit rotates with the cup; this puts a bend, and a pull, on the stem of the fruit, thus having some tendency to snap off the stem clean and also some tendency to pull the fruit stem away from interfering leaves and branchlets. Thus—a large part of the time—this bending and pulling will cause the root of the stem to part from the fruit, or in fruit growers' language, will cause an advantageous abscission of the stem from the fruit at the juncture of the stem and the fruit.

The configuration of the cup as a single member that is a part of a spherical shell, and which rotates on a transverse axis of the sphere is a very important secondary feature. The vacuum with its three way action, i.e. holding fruit in the cup, signaling for actuation of the cutter and helping transport the fruit after picking is a most important and primary feature of the invention.

It will be appreciated that the unitary rotating cup of this invention may be in the form of a split cup. Such a split cup has two jaws rotating to come together so as to sever the stem of the fruit and allowing opening of them for fruit to be drawn into the tube by vacuum and gravity.

It will further be appreciated that the unitary pivoted cup which provides one moving shear edge cooperating with a fixed shear edge at the end of the tube makes possible fewer moving parts than the split cup with its two moving shear edges. However, both types may be used to give the abscission action in separating the fruit from its growth source.

Other advantageous structural features incorporated in this invention are disclosed herein and may be included, such as:

(1) Manually operated and controlled elevation and azimuth control devices as well as automatic range control mechanisms for universally directing the fruit harvesting mechanism toward the fruit to be harvested;

(2) Automatic reset devices for rapidly setting the fruit harvesting mechanism in condition for another fruit seeking on gathering, removing, conveying and collecting cycle of operation;

(3) A fruit transfer mechanism or means that is in structural cooperation with the picking means and/or extender mechanism for increasing the distance between the point of fruit harvest and the point of fruit collection;

(4) A fruit discharge mechanism for rapidly and automatically removing the harvested fruit from the extender mechanism and/or transfer means without any undesirable effect upon the fruit conveying capabilities of the fruit harvester;

(5) An ensilage collector for collecting any foliage that may be removed from the tree limbs by the fruit removing device, and for preventing such foliage from also falling in the collector and from being undesirably ingested by the system's air moving device.

(6) Plural fruit removing mechanisms for substantially simultaneously removing more than one piece of fruit at a time;

(7) A control handle type azimuth, elevation and range control mechanism where in actuation of control devices associated with the handle semi-automatically controls range (length) movements and cutter control actuation of the picking head or fruit harvesting mechanism as azimuth and elevational movements of the picking head are manually produced by the operator.

(8) Various sources of power for the harvester apparatus, such as pressure and vacuum pumps and electric generators.

(9) Harness mechanism for universally supporting the "picking" tubes upon and about the body of the operator; and

(10) Ground or vehicle engaged support mechanism for universally supporting the "picking" tubes upon and about the ground or vehicle as the case may be, thus considerably reducing the weight that the operator need carry during the use of the harvester.

(11) Simplified automatic fruit picking means which may be strapped or otherwise supported on the operator's or worker's arm to conform to natural arm movements as in hand picking, or a picking means can be strapped to each arm, to provide a dual automatic fruit removing capability for each worker as when two hands are used for picking at the same time, thus increasing the rapidity and ease by which the worker can select fruit and effect its removal and collection.

Certain structural modifications are anticipated relative to the inclusion of any one or more of the above listed additional structural features so that the aforementioned features and objects of this novel fruit harvester are effectively and efficiently achieved. Any of these contemplated additional features, as well as others that would be obvious to one skilled in the art, are mentioned herein to clearly illustrate the versatility and utility of this invention and not to limit it.

Other features, objects and advantages of this invention will be apparent from the following description, reference being made to the accompanying drawings in which like reference numerals are used to designate like parts throughout, it being understood that such description and drawings are illustrative and not limitative of this invention.

DESCRIPTION OF THE DRAWINGS

FIG. 1A is a perspective view of an alternate arrangement of the apparatus shown in FIG. 1 slightly modified and using two picking heads each one attached to an arm of the operator for separate hand control.

FIGS. 2A and 2B are exploded views of the "picking" tubes and head of FIG. 1, such consisting of a support mechanism, control mechanism, extender mechanism and fruit harvesting mechanism. (These figures may be placed in a co-axial position (see common center line) for visual clarity purposes.)

FIG. 3 is a more detailed exploded view of the control mechanism of FIG. 2A.

FIGS. 4A and 4B are respectively front and rear plan views of the extender mechanism of FIG. 1 with both the larger lower tube and the smaller upper tube broken intermediate their ends to graphically represent a longer length than is shown in the drawing, and with the support, control and fruit harvesting mechanisms removed for visual clarity purposes.

FIGS. 9 and 10 are cross-sectional views of the top portion of the upper extender tube when respectively viewed upwardly from the view planes 9—9 and 10—10 of FIG. 4A, each with the fruit removing mechanism removed for graphic clarity.

FIG. 11 is a cross-sectional view of the top portion of the upper extender tube when viewed upwardly from the view plane 11—11 of FIG. 4A.

FIG. 12 is a cross-sectional view of the top portion of the upper extender tube taken along the view plane 12—12 of FIG. 11.

FIG. 23 is a plan view of a preferred embodiment of an ensilage collector and fruit discharge mechanism for this invention.

FIG. 24 is a bottom view of the fruit discharge mechanism taken along the view plane 24—24 of FIG. 23.

FIG. 25 is a cross-sectional view of the ensilage collector taken along the view plane 25—25 of FIG. 23.

FIG. 26 is a plan view of an alternate embodiment of a control mechanism for this invention showing "in-line" type control handles with portions of the apparatus cutaway for graphic representation purposes.

FIGS. 27 and 28 are respectively opposite end views of the control box of the "in-line" control mechanism of FIG. 26 taken respectively along the view planes 27—27 and 28—28 thereof.

FIG. 32 is a schematic diagram of a preferred embodiment of a pneumatic control mechanism or system for operating the controls and the mechanisms of this invention.

FIG. 33 is a schematic diagram of a preferred embodiment of a pneumatic control system for the novel harvester as shown in FIG. 1.

FIG. 34 is a schematic diagram of a preferred embodiment of a pneumatic control system for the "in-line" fruit removing mechanism of this invention as shown in FIG. 26, and the dual arrangement shown in FIG. 1A.

FIG. 35 is a schematic diagram of a preferred embodiment of a pneumatic control system for operating the sensing means and cutter cup actuating mechanisms.

DESCRIPTION OF THE ILLUSTRATED EMBODIMENTS

Figure 1:
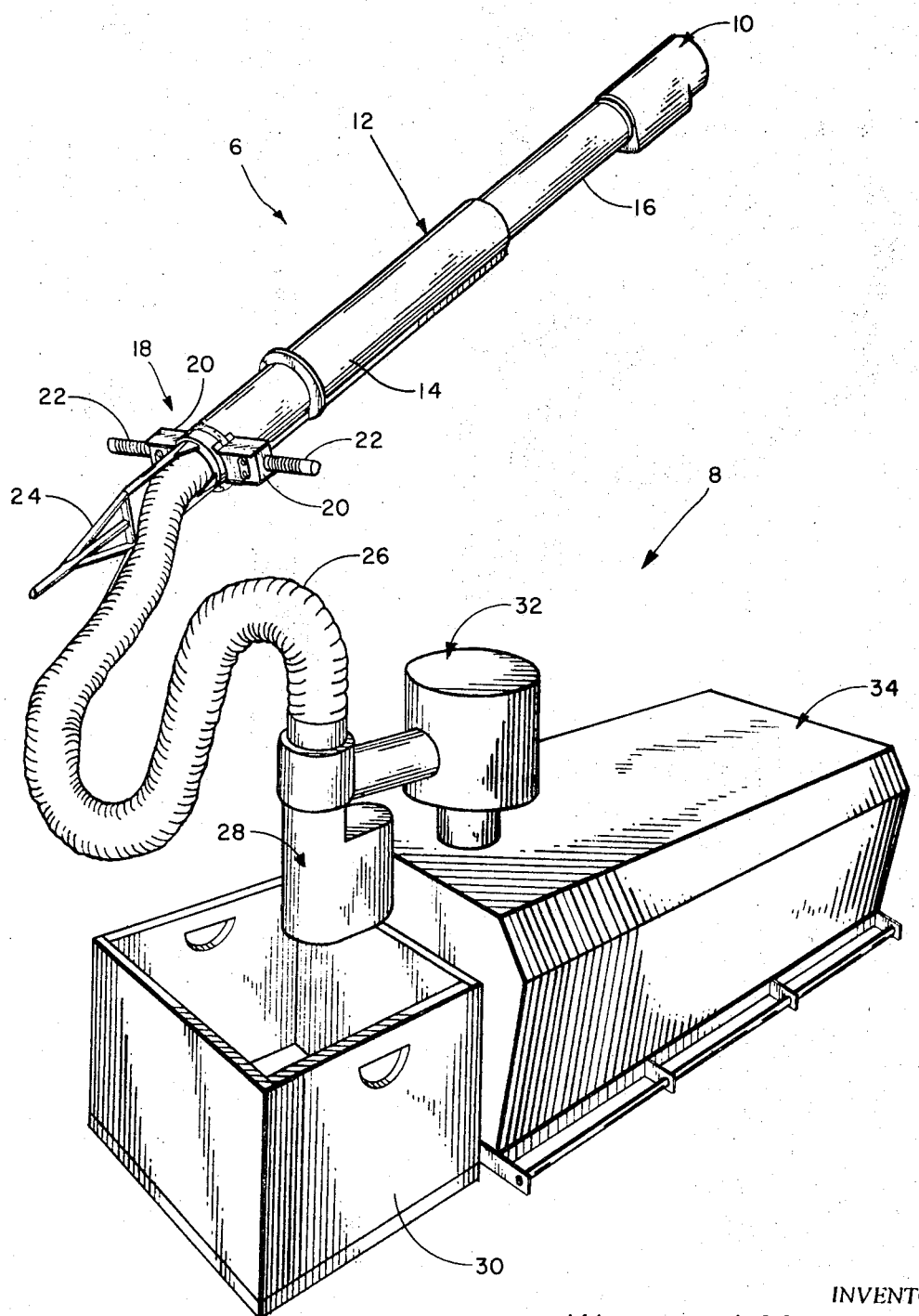
FIG. 1 is a perspective view of the article handling apparatus of this invention.

Referring now in detail to the drawings, FIG. 1 shows a perspective view of the novel article handling apparatus of this invention when used as a fruit harvester and incorporating means to extend the fruit picking tube length out to the fruit to be picked. The apparatus has a fruit picking means 6 which is operably connected to a fruit collecting and foliage separating means broadly indicated by the numeral 8. The picking means includes a fruit harvesting mechanism or picking head 10 that detects the presence of fruit to be harvested and rapidly and automatically removes the fruit; an extender mechanism, generally indicated at 12, that has a lower picking tube 14 and an upper picking tube 16; a range and azimuth control mechanism, generally indicated at 18, that includes left and right control boxes 20 and a pair of left and right "handle-bar" type control handles 22 to be gripped by the operator when fruit is to be picked. A support mechanism 24 is provided at the base of the control mechanism that can be ball-joint mounted either on a harness (not shown) worn on the body of the operator, or on a ground plate or box, or on the body of a vehicle, in each case to provide universal movement capability of the harvester means and to reduce the effective weight that the operator would be required to carry when using this novel harvester. The fruit collecting and foliage separating means have a fruit transfer mechanism 26 providing flexible transfer tube means connected into the base portion of the picking means to convey the fruit away from the picking means 6; and a fruit discharge mechanism 28 that rapidly and automatically removes the harvested fruit from the fruit transfer mechanism 26 without any undesirable effect upon the fruit seeking or drawing, removing, conveying and collecting capabilities of the apparatus. Associated with the apparatus is a fruit collector 30 which stores and holds in a confined volume the harvested fruit, such collector may be a wooden box or crate as shown, or other type container, or may be the bed or body of a vehicle. A foliage collector 32 is provided that separates, collects and stores any foliage that may be removed from the tree limbs by the fruit harvesting mechanism 10 and for preventing such foliage from being ingested by the harvester's air-pump or power source; and a power source 34 that provides the selected source of energy to the harvester. Such energy may be derived from high and low fluid pressure sources when a pneumatic/mechanical harvester system is used, or an electrical source when an electrical/mechanical harvester system is used, or it may be a combination of fluid pressure and electrical sources.

In FIGS. 2A and 2B, the elements of the fruit harvesting mechanism 10, extender mechanism 12, control mechanism 18 and support mechanism 24 are exploded for graphical representation purposes.

The support mechanism 24 consists of a support frame 36 having, for example, two converging legs 38 secured to two parallel legs 40 which in turn are secured to the lower portion of the extender mechanism 12. Additional strength is provided by a T member 37 that has its lower portion secured to the diverging ends of legs 38 but extending beyond them and its outer end secured to the parallel legs 40. At the bottom of the support frame 36 is the lower end 39 of the T member 37 which may be used to engage a universally rotatable ball and socket member (not shown) that can be supported on the body of the user or on the body of a support vehicle or platform. It is to be understood that other types of support mechanisms may be used for supporting the picking means 6 and for providing universal movement of it and the fruit harvesting mechanism 10 with respect to a fixed position of the support and/or the operator.

A tube adapter 42 is provided for securing the extender mechanism 12 to the fruit transfer mechanism 26. This adapter includes a flat annular plate 44 defining circular opening 44a therein for allowing passage therethrough of picked fruit, and an upper cylindrical flange 43 and a lower cylindrical flange 45, each of which are rigidly secured to the plate 44. The tube adapter 42 also supports the support frame 36. Respectively secured to the cylindrical flanges 43, 45 of the tube adapter 42 are the lower picking tube 14 and the fruit transfer mechanism 26.

The fruit transfer mechanism 26 includes a transfer tube 46, and control fluid high and low pressure tubes 48, 50 which may be either permanently or releasably secured to the transfer tube 46 and may be protected by a protective cover (not shown).

Secured ot the lower end of the extender mechanism 12 by the ring clamp 52 is the control mechanism 18 which includes the left and right control boxes 54, 56, left control box covers 51, 53, right control box covers 55, 57 and left and right control handles 58, 60. The high and low pressure tubes 48, 50 enter at the bottom of the right control box 56 while three control fluid pressure tubes 62, 64, 66, interconnect the right control box 56 with the left control box 54. These interconnecting tubes are protected by the cover 59. Two control fluid pressure tubes 68, 70 exit upwardly from the right control box 56, and one control fluid pressure tube 72 exits upwardly from the left control box 54, each of which extend along, abut and are secured to the lower picking tube 14, and each has an end terminating at the upper end thereof (see breakaway section in FIG. 2B). Another control fluid pressure tube 74 extends downwardly from the right control box 56 and is secured, via a tube fitting, to the annular plate 44 of the tube adapter 42.

On the rear side of the right control box 56 are the UP and DOWN control buttons 76, 78 which when they are selectively operator depressed respectively couple to the extender mechanism 12 either a low pressure air source, e.g., 0.5 p.s.i.a., which acts to lengthen the mechanism or a high pressure air source, e.g. 29.7 p.s.i.a., which acts to shorten it by telescoping action between tubes 14 and 16. Similarly on the rear side of the left control box 54 are the OVERRIDE and RESET buttons 80, 82 which when selectively operator depressed respectively couple to the fruit harvesting mechanism 10 a high pressure air source, e.g. 29.7 p.s.i.a., which drives this mechanism through its normal fruit harvesting cycle, to sever a fruit or the like from its growth source, and a low pressure air source, e.g. 0.5 p.s.i.a., which returns it to its normal condition in readiness for a fruit harvesting cycle.

Since a more detailed description of the structure and function of the control mechanism 18 will be set forth later with regard to FIG. 3, it will suffice at this point to state that: (1) tube 68 is a high pressure fluid line, e.g. for air at 134.7 p.s.i.a., which delivers air at high pressure to the fruit harvesting mechanism 10; (2) tube 70 is a variable pressure fluid line, e.g. for air between 0.5 p.s.i.a. and 29.7 p.s.i.a., which delivers air at variable pressure to the extender mechanism 12 for lengthening and shortening the fruit picking means on demand; (3) tube 72 is another variable pressure fluid line, e.g. for air at 0.5 p.s.i.a. to 29.7 p.s.i.a., which delivers air at variable pressure to the fruit harvesting mechanism 10 to actuate it automatically during its normal fruit harvesting cycle, or upon demand during its manual override cycle, or upon demand during its manual reset cycle; and (4) tube 74 is also another variable pressure fluid line, e.g. for air at 0.5 p.s.i.a. to 29.7 p.s.i.a., which delivers the lower pressure air to the tube adapter 42 when either the UP or DOWN buttons are actuated, and delivers the higher pressure air when a predetermined extender mechanism length is established, and then releasably holds the extender mechanism in this predetermined position until a new length is desired, i.e. either the UP or DOWN button is actuated. It will be appreciated that the pressures stated are exemplary and that others may be adapted.

Referring now to the upper part of FIG. 2A and the lower part of FIG. 2B, the upper picking tube 16 is coaxial with and telescopes within the lower picking tube 14, with the lengths of these tubes 14, 16 being about equal. An upper bushing and seal 84 and a lower bushing and seal 86 concentrically align the picking tubes 14, 16 and establish a closed chamber 88 therebetween which is substantially impervious to air, particularly at pressures exceeding 15 p.s.i.a. The upper and lower bushings and seals 84, 86 slidably engage two oppositely positioned rigid tubes 85, 87 (see FIG. 6). Two parallel-wound, coiled tubes 69, 71 are wrapped about the upper tube 16 and between the upper and lower picking tubes 14, 16. These coiled tubes 69, 71 begin at the upper outer end of the lower picking tube 14, with their upper ends respectively connected via two fittings to the pressure tubes 68, 72 and terminate at the lower inner end of the upper picking tube 16, with their lower ends respectively connected via two fittings to the lower bushing and seal 86. Connected to the lower ends of the coiled tubes 69, 71 via two fittings and two small connector tubes 73, 75, are two pressure lines 90, 92 that extend from 73, 75, and 68, 72 upwardly from the lower bushing and seal 86, within the upper picking tube 16 to the upper inner end of the upper picking tube 16 where they exit via two fittings and connect to the fruit harvesting mechanism 10. A protective cover 94, is provided to protect the three pressure tubes 68, 70, 72 while a protective housing 96, is provided to protect the pressure tubes 90, 92 at the point where they exit from the upper tube 16.

It should be noted here that control fluid continuity is advantageously established between the control mechanism 18 and the fruit harvesting mechanism 10 through the following structural path: Along the outside of the lower picking tube 14 via the three pressure tubes 68, 70, 72 to the upper inner end of the lower picking tube 14; then through the coiled tubes 69, 71 between the upper and lower picking tubes 14, 16 to the lower outer end of the upper tube 16; then through the lower bushing and seal 86 and along the inside of the upper tube 16 via the two pressure tubes 90, 92 to the upper inner end of the upper tube 16; and finally passing through the upper end of the upper tube 16 and connecting to the fruit harvesting mechanism 10. By this construction, although the upper tube 16 longitudinally moves with respect to the lower tube 14, fluid continuity between the control mechanism 18 and the fruit removing or harvesting mechanism 10 is advantageously maintained. This fluid continuity is needed in this preferred embodiment of this invention so as to provide a fluid pressure source for automatic operation of the fruit harvesting mechanism 10.

The fruit harvesting mechanism 10 has a support tube 100 which is connected to the upper end of the upper picking tube 16 by a ring clamp 98. This support tube 100 has a mounting plate 102 secured to its lower end and a cutter housing 104 secured to its upper end with spaced, stiffener rings 106 for strengthening it. Also provided on the mechanism 10 and spaced below the support tube are a pneumatic, cutter actuating valve 108, and its associated air cylinder 110, pressure sensor 112 and a rack and pinion mechanism generally indicated at 114.

Figure 18:
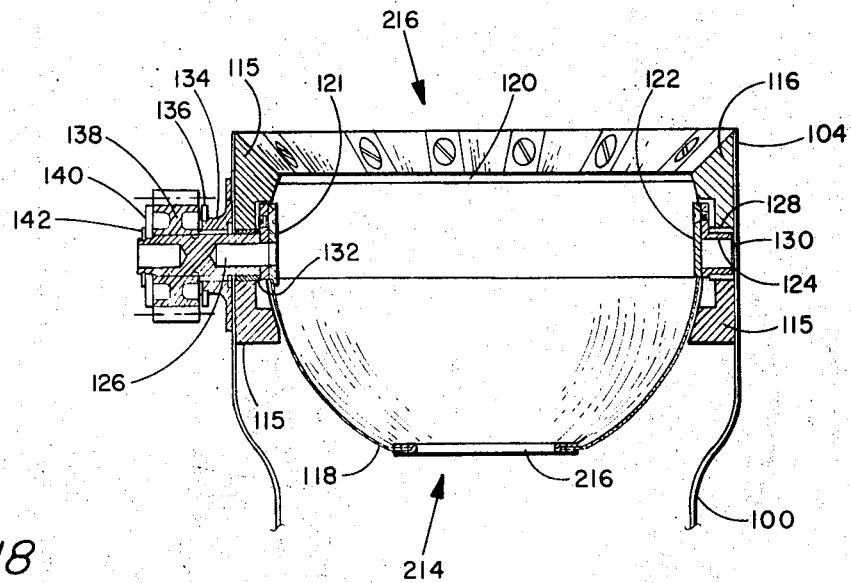
FIG. 18 is a cross-sectional view of the upper portion of the fruit harvesting mechanism taken along the view plane 18—18 of FIG. 17, which graphically shows a cross-section of a preferred embodiment of a rotatable, fruit removing device for this invention.
Figure 20:
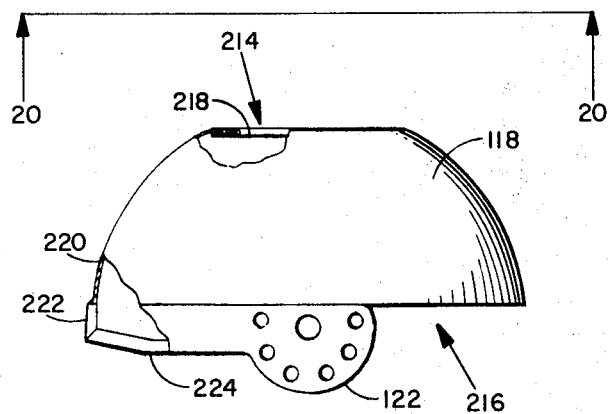

Mounted within the cutter housing 104 are the lower and upper bushings 115, 116, the rotatable cutter cup 118 and the stationary cutter 120. The cutter cup 118 has two ear members 122 that extend from its upper edge and are 180° apart. Cutter support plates 124, 126 respectively engage the ear members 122 with each having a shaft member for rotatably mounting the cutter cup 118 within and between the lower and upper bushings 115, 116. The shaft of the upper cutter support plate 124 is held in position by the upper bearing 128 and secured to the cutter housing 104 by an upper locking ring 130, while the shaft of the lower cutter support plate 126 is held in position by the lower bearing 132 but first passes through the flanged support 134, upper rack retainer 136, pinion gear 138 and lower rack retainer 140 before it is secured to the cutter housing 104 by the lower locking ring 142. The pinion gear 138 is rigidly secured to the shaft of the lower cutter plate 126 so that when it rotates about its axis it causes the cutter cup 118 to rotate about the same axis. (See esp. FIGS. 2B, 18, 20.)

A slot is provided along the upper peripheral edge of the upper bushing 116 into which fits the stationary cutter 120. A very slight portion of the inner edge of the stationary cutter 120 extends beyond the inner face of the upper bushing 116. Thus, when the cutter cup 118 rotates, e.g., clockwise about the common axis of its support on the shafts of plates 124, 126, its edge just barely touches the protruding edge of the stationary cutter 120 so as to provide a shear or "scissor" type cutting action, thus to sever the stem of a fruit in the cup.

The rack and pinion mechanism 114 includes a rack 144, rack clevis 146, clevis pin 148 and rack guide 150. Rack clevis 146 is rigidly secured to the drive shaft of the air cylinder 110 and releasably secured to the lower end of rack 144 via the clevis pin 148, which in turn is slidably secured to the rack guide 150 via the upper and lower rack bearings 152, 154. Since the rack guide 150 is U-shaped, only the upper end of the clevis pin 148 need be locked in place, i.e., the locking ring 156 prevents the rack 144 and clevis pin 148 from separating. In addition, an end plate 158 closes one end of the rack guide 150 and prevents the rack bearings 152, 154 from sliding out of the rack guide 150. To ensure positive engagement and relative positioning of the pinion gear 138 and rack 144, the upper and lower rack retainers 136, 140 sandwich these members. Retainers 136, 140 are spaced from and secured to each other by retainer spacers 160, locking nuts 162 and bushings 164. (See esp. FIGS. 2B and 16 to 18.)

For conveying control and cutter actuating fluid pressure to the mechanism 10 pressure tubes 90, 92 extend from picker tube 16 through the mounting plate 102 with the high pressure tube 90 being connected to the input port of the cutter actuating valve 108, and the variable pressure tube 92 being connected to one end of the condition or pressure sensor 112. The other end of the pressure sensor 112 is mechanically connected to the "diverter" rod of the actuating valve 108, while the output ports of the actuating valve 108 are respectively connected to opposite ends of the air cylinder 110. Finally, the sensor 112 is coupled to the support tube 100 so that it can sense any change of pressure conditions that occur in the atmosphere therein, e.g., a drop in pressure. Conventional brackets (not shown) may be used to secure the actuating valve 108, air cylinder 110, sensor 112, and rack and pinion mechanism 114, to either the support tube 100 or to mounting plate 102. Also, a protective cover 168 is provided to protect the elements of the fruit harvesting mechanism 10, such extending around the tube 100 and these elements from the cutter housing 104 to the mounting plate 102 where it is releasably secured in position.

The normal condition of the fruit harvesting mechanism 10 when it is ready for fruit picking operations is as follows:

(1) Rate of flow of atmospheric air and atmospheric air pressures in the support tube 100 are relatively high.

(2) The cutter cup 118 is centered around its principal axis with its small opening in the base of it facing downward as shown in FIG. 2B.

(3) The drive shaft 123 of the air cylinder 110 is retracted with the pivoted end of the rack 144 positioned in the rack guide 150 remote from the end plate 158.

(4) The actuator valve 108 has its diverter rod retracted and is supplying air at high pressure to the upper end of air cylinder 110 that is, full high pressure, e.g. about 134.7 p.s.i.a.

(5) The sensor 112 is in pressure balanced condition with its mechanical shaft retracted.

In operation, the user adjusts the position of the mouth of the collector tube or picking means by extending and/or contracting the assembly of tubes 14, 16, 100 making up the collector tube and by providing elevation and azimuthal alignment by arm movement and/or manipulation of the control handles. Upon proper alignment, the user or operator extends the collector tube slightly thereby sealing the mouth of the collector tube with the fruit, causing automatic ingestion of the fruit. The fruit then travels down the collector tube through the flexible transport tube and into the collector which is suitable receptacle. The mouth of the collector tube is immediately repositioned to the next orange or piece of fruit to be picked and the cycle is repeated.

A cycle of operation of the fruit harvesting mechanism 10 is as follows:

(1) When a piece of fruit is to be harvested the operator hand positions the picking means 6 and extends the extender or picking tube(s) so as to position the fruit within the cutter cup 118. This positioning and/or the reduced pressure of the air flowing into the tube draws or places the fruit snugging it so as to block the small opening in the base of the cutter cup resulting in decreased rate of air flow within the support tube 100 and a corresponding drop in the pressure of the atmosphere within the bore of this tube.

(2) This lowered pressure condition is sensed by the sensor 112 and unbalances pressures across a diaphragm within it resulting in mechanically driving the diverter rod 119 of the actuator valve 108 upward, since it is operatively connected through a coupling 113 to the output shaft of the sensor 112, and the coupling of the high pressure fluid source to the lower end of the air cylinder 110.

(3) This fluid, acting on the piston in cylinder 110 in turn drives the air cylinder shaft upward which drives the rack 144 up the rack guide 150 toward the end plate 158.

(4) The pinion gear 138 is thereby rotated clockwise (when considered from the upper side of the mechanism) by the rack 144 which in turn imparts a corresponding clockwise rotational movement to the cutter cup 118.

(5) As the cup 118 thus moves around and over the upper portion of the fruit to be harvested the stem of the fruit is thereby sheared by the corresponding edges of the cutter cup 118 and stationary cutter 120 at one side of support tube 100.

(6) The now harvested fruit begins to fall down the support tube 100 by virtue of gravitational forces, but because the small opening in the cutter cup 118 is now facing upward or outwardly, i.e., 180° displaced about its axis of support from the position shown in FIG. 2B, and because atmospheric pressure is now exerted against the top side of the harvested fruit, air flow through the support tube increases as does atmospheric air pressure therein. Thus also, the harvested fruit is propelled downward within the continuous open bore of the picking means travelling down through support tube 100 and the extender mechanism 12 and through the tube of the transfer means to be collected and have any ensilage separated from it.

(7) The upper end of the rack 144 then encounters the upper or outer end of the diverted rod 119 of the actuator 108 driving it inward or downward which again couples the source of high pressure fluid to the upper end of the air cylinder 110. This also mechanically drives the shaft of the sensor 112 downward or inward to its normally retracted position.

(8) This higher pressure above the piston in the air cylinder then drives its shaft downward thus driving the rack 144 down the rack guide 150 in a direction away from the end plate 158 so as to rotate the pinion gear counter-clockwise relative to its movement for cutting, or its abscission severing.

(9) The cutter cup 118 is thereby correspondingly reversely rotated counter-clockwise to its normal position as indicated in FIG. 2B.

(10) With the removal of a fruit from blocking the small opening for air passage in the picking means which is provided by the cutter cup 118, sensor 112 then detects the resulting increase in pressure of the atmosphere in the support tube 100 and returns to its balanced state and holds its mechanical shaft in its normally retracted position.

The fruit removing mechanism 10 has thus completed one cycle of operation and is in readiness for another fruit removing cycle.

The operation of the apparatus also provides an override cycle for the harvesting mechanism which can be effected manually so as to actuate the cutter cup 118 to rotate it notwithstanding the pressure condition of atmosphere within the support tube 100 (e.g. when no fruit is present at the cutter cup). This manual override cycle is substantially identical to the above described semi-automatic fruit removal or harvesting cycle except that the diaphragm and its attached mechanical shaft of the sensor 112 is driven by the application of high fluid pressure via the control fluid pressure tube or line 92 when the OVERRIDE button is actuated. This capability is useful for testing cutter actuation and in harvesting operations if for example twigs or foliage enter the cutter cup but do not block its small opening and in other cases.

The apparatus additionally provides an operational reset cycle which can be operated at the pleasure of the operator for returning the harvesting mechanism to its normal condition of readiness to initiate a harvesting or fruit removing cycle of operation. This reset cycle is not necessarily a complete cycle of operation as above described, since for numerous reasons, e.g., jamming, it may be desirable to merely return the fruit removing mechanism 10 to its normal state ready for harvesting from some intermediate step in its cycle of operation. Such resetting of the fruit removing mechanism 10 is achieved when the RESET button 82 is manually actuated by the operator since this action couples vacuum or control fluid at low pressure to the sensor 112 via the pressure line 92. This drives the mechanical shaft of the sensor 112 to its normally retracted position, which in turn pulls the diverter rod 119 of the actuator 108 inward, as occurs when the rack 144 automatically resets the fruit removing or harvesting mechanism 10 during a normal fruit removing cycle. Thus, the reset cycle operates merely to return the fruit removing mechanism 10 to its normal condition from any intermediate position that it may be in during its cycle of operation.

Referring now to FIG. 3 there is shown an enlarged and exploded view of the control mechanism 18, which also includes the above described support mechanism 24, and a portion of fruit transfer mechanism 26 and tube adapter 42. In this view the fruit transfer mechanism is releasibly secured to the lower cylindrical flange 45 of the tube adapter 42 by the two ring clamps 41, while the control mechanism is releasibly secured to the upper cylindrical flange 43 of the tube adapter 42 by the ring clamp 52. For graphic clarity in FIG. 3, the portion of the ring clamp 52 that engages and secures the control boxes 54, 56 is shown in broken lines in position therewith, while the remaining portion which engages and secures about the lower picking tube 14, is shown in full lines.

High and low pressure control fluids from their respective fluid pressure sources are operatively coupled to the right control box respectively through the pressure tubes 48, 50 and male connectors 170, 172 to the in-ports of the fittings 174, 176, respectively. The out-ports of fitting 174 are respectively coupled, via conventional tubing (not shown), (1) to the in-port of the adjustable pressure regulator 178, (2) to the high pressure tube 68, and (3) to the brake valve 180, which in turn is operatively coupled into an aperture provided through the circular annular plate 44 of the tube adapter 42 via the high pressure tube 67. The out-ports of fitting 176 are respectively coupled (1) to the UP valve 182, which in turn is coupled to the low pressure tube 70, and (2) to the RESET valve 186, which in turn is coupled to the variable pressure tube 72.

From the pressure regulator 178 control fluid at a selected pressure is coupled to the in-port of the fitting 190 which in turn has one of its out-ports coupled to the OVERRIDE valve 188 and its other out-port coupled to the DOWN valve 184.

It should be noted at this point that control fluid, e.g. air at high pressure (e.g. 134.7 p.s.i.a.), vacuum or low pressure (e.g. about 5 p.s.i.a.) and intermediate or regulated low pressure (e.g. about 29.7 p.s.i.a.) from their sources associated with the power source 34, are delivered to various control valves in the control mechanism 18, to the air cylinder 110 via high pressure tube 68, to the sensor 112 via variable pressure tube 72, and to the closed chamber 88 between the picking tubes 14, 16 via low pressure tube 70, thus placing the control mechanism 18 in condition for performing its UP, DOWN, OVERRIDE, RESET and automatic braking functions, as well as setting the fruit harvesting mechanism 10 in condition for a cycle of operation.

For additional understanding of its operation, it will be appreciated that the apparatus is placed in the field or grove, say, for picking oranges, and the power source energized so as to develop the control fluid pressures from their source of supply and transmit such fluid under the desired pressures as indicated, to the picking means and establish air flow down through the picking tubes. The operator braces the support mechanism 24 on the operator's harness (not shown) at about his waist or other support means and positions the outermost end of the fruit picking means over a fruit to be picked by gripping the handle bars for azimuth control and with his thumbs at the control buttons 76, 78, 80, 82 for control of range and fruit severing or removing. The operator then controls the picking means and its fruit harvesting mechanism selectively by digitally actuating the desired buttons in order to extend or retract the length of the picking means, to harvest fruit, or otherwise to cycle the apparatus as follows:

When the UP button 76 is actuated to extend the length of the picking means 6 control fluid at a low or vacuum pressure, e.g. from about .025 to about 10 p.s.i.a. but preferably about .5 p.s.i.a., is operatively coupled via the UP valve 182 to the be closed cylindrical chamber 88 via the variable pressure tube 70. This in turn causes the lower bushing and seal 86 to move under impetus of atmospheric pressure upwardly toward the upper bushing and seal 84, reducing the volume in chamber 88 and thus increasing the combined length of the picking tubes 14, 16 as tube 16 telescopes outward within tube 14. Actuation of the UP button also actuates the brake valve 180 by virtue of the coupling plate 77 which mechanically actuates the brake valve 180 when either the UP or DOWN buttons are actuated. This closes the brake valve 180 and prevents high pressure application to the brake mechanism associated with the extender mechanism 12. A detailed description of the brake mechanism will be set forth below with respect to FIG. 6.

When the operator actuates the DOWN button 78 in order to decrease the range or length of picking means 6 a regulated control fluid pressure, e.g., from about 20 to about 40 p.s.i.a. but preferably about 29.7 p.s.i.a. is thereby first operably coupled into the normally open in-port of the UP valve 182 and then operatively coupled into the closed chamber 88 via the variable pressure tube 70. This increases the pressure in chamber 88 causing the lower bushing and seal 86 to move downwardly away from the upper bushing and seal 84, thus decreasing the combined length of the picking tubes 14, 16 as tube 16 telescopes downward within tube 14. Actuation of the DOWN button also actuates the brake valve 180 which again closes and disengages the brake mechanism.

When either the UP or DOWN buttons are actuated, the brake mechanism is automatically disengaged and will not automatically engage until the respective button is deactuated.

When the operator actuates OVERRIDE button 80 to cause a cycle of cutter operation manually, control fluid under a regulated pressure, e.g., 29.7 p.s.i.a., is operatively coupled through the override valve 188 into the reset valve 186 where it passes through and is then coupled into the variable pressure tube 72. This in turn couples the pressurized control fluid, from its source, via variable pressure tube 92, into the sensor 112 which is thereby unbalanced so as to commence a normal cycle of operation of the fruit harvesting mechanism 10. Thus, the OVERRIDE cycle also permits the operator to selectively remove fruit from its natural habitat notwithstanding the pressure condition within the support tube 100. This is advantageous for cutting short-stemmed fruit, or when the fruit to be harvested for any reason is not completely blocking the flow of air through the smaller opening in the cutter cup 118.

When the RESET button 82 is actuated by the operator, control fluid at low pressure, e.g., .5 p.s.i.a., is operatively coupled to the variable pressure tube 72 through the rest valve 186. This in turn couples the fluid at low pressure into the sensor 112 via the variable pressure tube 92. Accordingly, the shaft of the sensor 112 retracts to its normally balanced position carrying link 113 downward which in turn causes the diverter rod 119 of the actuator valve 108 to retract downward so as to return all the elements of the fruit removing mechanism 10 to their normal positions in readiness for a normal cycle of operation. Thus, the fruit removing mechanism 10 is reset in readiness for a cycle of operation whenever the reset button 82 is actuated notwithstanding the intermediate position it may be in during a cycle of operation.

Referring now to FIGS. 4A and 4B, there are respectively shown front and rear elevation views of the extender mechanism 12 with the fruit removing mechanism 10 control mechanism 18 and support mechanism 24 removed for visual clarity purposes, and with the lower and upper picking tubes broken intermediate their lengths to represent greater lengths than illustrated.

In these elevation views of the extender mechanism 12, the lower and upper picking tubes 14, 16, the circular flat annular plate 44 of the tube adapter 42, and the upper bushing and seal 84 are readily visible, as are the ring clamps 41 that secure the hollow transfer tube portion of the fruit transfer mechanism 26 to adapter 42, the longitudinally extending control fluid-carrying pressure tubes 68, 70, 72, the protective upper housing 96, and the mounting plate 102. In addition, the lower end of the support of rigid tube 85, is shown coupled to the high pressure tube 67 and support or rigid tube 87 secured in position by a conventional nut.

Figure 5:
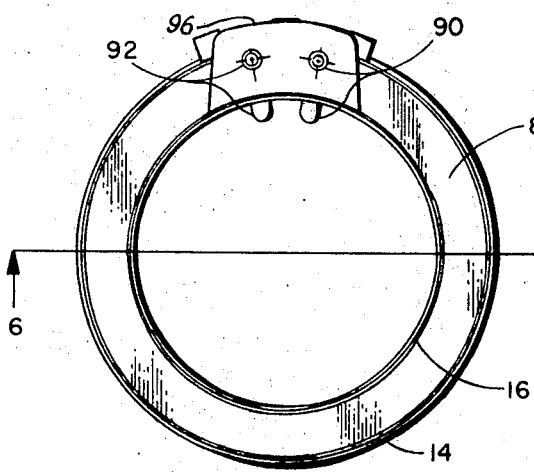
FIG. 5 is a top view of the extender tubes taken along the view plane 5—5 of FIG. 4A.

A cross-sectional view of the extender mechanism 12 is shown in FIG. 5, which is taken from the view plane 5—5 of FIG. 4A. In this view the outer and inner picking tubes 14, 16 are shown in telescoping position with the pressure tubes 90, 92 passing through the upper end of the inner picking tube 16 and exiting from the upper housing 96.

Figure 6:
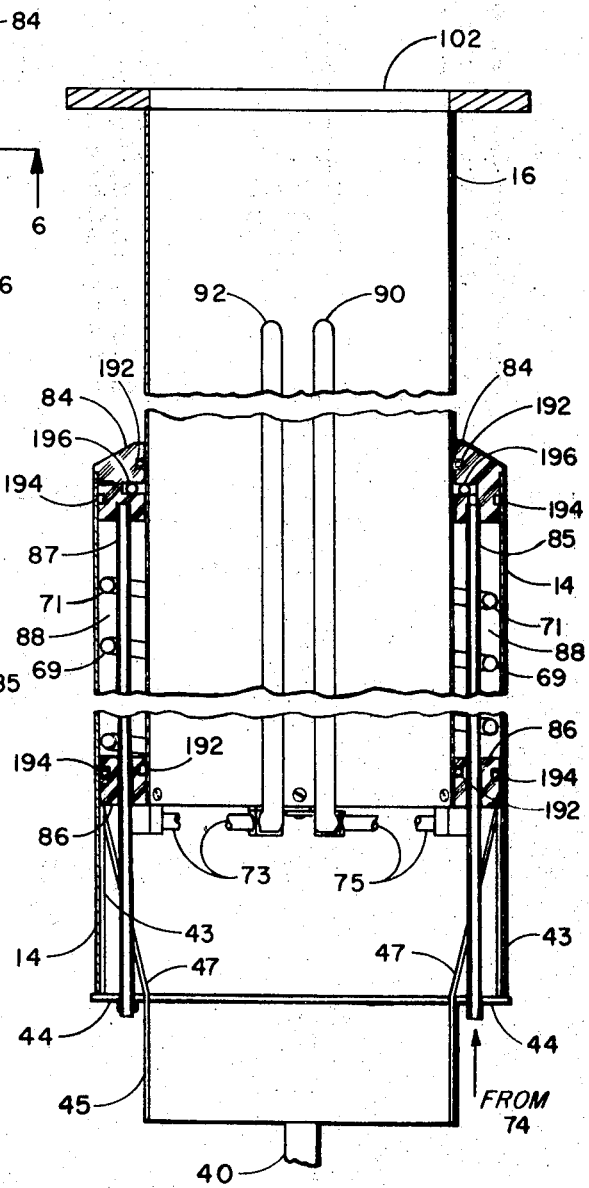
FIG. 6 is a cross-sectional view of the extender tubes taken along the view plane 6—6 of FIG. 5.

In FIG. 6 there is shown a cross-sectional view of the extender mechanism taken from the longitudinal view plane 6—6 of FIG. 5. This view shows the outer and inner picking tubes 14, 16 held in their relative telescoping position by the upper and lower bushing and seals 84, 86, which may be constructed from well known semi-rigid materials such as nylon or Teflon. To establish a substantially air impervious seal between the inner surface of the outer tube 14 and the outer surface of the inner tube 16 between the upper and lower bushings and seals 84, 86, inner and outer O-rings 192, 194 are positioned therein with respective inner and outer annular channels in each of the bushings and seals and, such may be constructed from neoprene materials or from some other well known flexible and compressible sealing material.

The upper bushing and seal 84 is permanently secured to the inner surface of the outer tube 14 and slidably secured against the outer surface of the inner tube 16, whereas the lower bushing and seal 86 is slidably secured against the inner surface of the outer tube 14 and permanently secured to the outer surface of the inner tube 16. By this construction, the outer surface of the inner tube 16 slidably engages the upper bushing and seal 84, whereas the inner surface of the outer tube 14 slidably engages the lower bushing and seal 86.

Alignment and guidance of the picking tubes 14, 16, as well as anti-rotation thereof, is provided by the support rigid tubes 85, 87, each having their upper end secured to the lower end of the upper bushing and seal 84, and their lower end secured to the circular plate 44 of the tube adapter 42. In addition, the lower bushing and seal 86 has two holes therein through which the support tubes 85, 87 respectively pass and slidably engage.

An additional inner ridge or inner slot in the form of an annular channel is provided in the upper bushing and seal 84 and in which an O-ring 196 is positioned in compressional engagement with the outer surface of the inner tube 16. This O-ring 196 functions as a frictional brake and locking mechanism. This is achieved by providing an opening through the upper bushing and seal 84 that extends into the inner slot in which the O-ring 196 is seated, and by using a hollow rigid tube for the tube 85. By this construction, an unimpeded path is provided from the bottom open end of rigid tube 85 to the O-ring 196. Thus, when the brake valve 180 (see FIG. 3) is open and fluid pressure is coupled via pressure tube 67 to the circular annular plate 44, it is also coupled to the inner slot of the upper bushing and seal 84 and compresses the O-ring 196 device against the outer surface of the upper tube 16 so that frictional forces therebetween substantially prevent relative movement of the lower and upper tubes 15, 16. Although, the other support rigid tube 87 is shown as a hollow tube, it can be solid as well, or it can be identical to the support tube 85 wherein a second unimpeded path is provided and a fluid pressure source similarly coupled therethrough to the opposite side of the inner slot in the upper bushing and seal 84.

It is also contemplated that additional support or rigid tubes 85, 87 may be employed for added support and positioning purposes, as well as additional braking and holding O-rings 196 for braking and holding purposes, such being within the spirit and scope of this invention. Furthermore, braking and holding O-rings 196 can be structurally associated with the lower bushing and seal 86 as well or with both bushings and seals 84, 86, such again being within the spirit and scope of this invention. In this modification of the present invention the support tubes 85, 87 would be reversed from that shown in FIG. 6.

FIG. 6 also shows connector tubes 73, 75 which respectively coupled fluid pressure from its sources and from the coiled tubes 69, 71 into the pressure tubes 90, 92 through pressure tube passages extending through the lower bushing and seal 86, via conventional elbow fittings, with the path of the fluid pressure tubing thus formed extending upward via tubes 90, 92 towards the mounting plate 102 and downward through the tubing as described above to go along the transfer tube to their sources of pressure at the power source. Additionally, note that the tube adapter 42 includes a diverging inner member 47 that gradually changes the inner diameter of the tube adapter 42, from its maximum at the upper end to its minimum at approximately its middle.

FIGS. 7 through 11 are cross-sectional views of the extender mechanism 12 respectively taken along the view planes 7—7, 8—8, 9—9, 10—10 and 11—11 of FIG. 4A, such showing the structural relationships of the components of this mechanism from selected transverse view planes.

Figure 7:
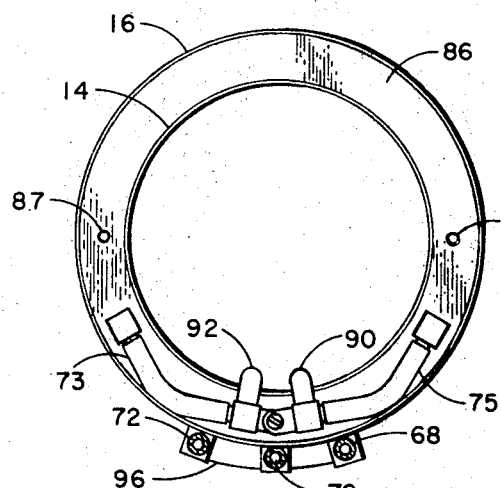
FIG. 7 is a cross-sectional view of the bottom portion of the lower extender tube when viewed upwardly from the view plane 7—7 of FIG. 4A with the fruit removing mechanism removed for graphic clarity.

FIG. 7 depicts structural details in cross-section as seen along a view plane that is just below the lower end of the inner tube 16. Primarily, this view shows the lower ends of the pressure tubes 90, 92 respectively connected to a first pair of elbow fittings, with the connector tubes 73, 75 then being respectively connected to the lower bushing and seal 86 via a second pair of elbow fittings.

Figure 8:
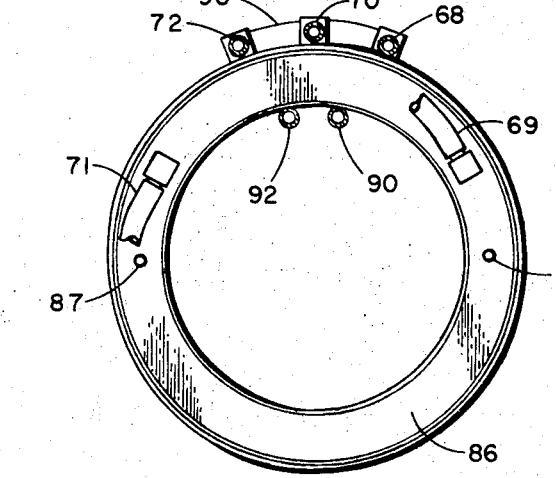
FIG. 8 is a cross-sectional view of the bottom portion of the lower extender tube when viewed downwardly from the view plane 8—8 of FIG. 4A.

FIG. 8 depicts structural details in cross-section as seen along a view plane just above the lower bushing and seal 86. Basically, this view shows the lower ends of the coiled tubes 69, 71 respectively connected to the passage for fluid carried thereby through lower bushing and seal 86 via two elbow fittings. Thus, control fluid continuity is established between the coiled tubes 69, 71 and the pressure tubes 90, 92 from the upper side of the lower bushing and seal 86 to its lower side via the respective elbow fittings and the connector tubes 73, 75.

FIGS. 7 and 8 also show the upper and lower picking tubes 14, 16, the pressure tubes 68, 70, 72, the rigid tubes 85, 87 for braking and guiding support and the upper housing 96.

FIGS. 9 and 10 respectively show structural details in cross-section as seen along view planes that are respectively below and above the location where the pressure tubes 68, 70, and 72 enter the lower picking tube 14. In FIG. 9 the two outer presure tubes 68, 72 are respectively connected into the coiled tubes 69, 71 via a pair of outer elbow fittings and a pair of inner elbow fittings, while the inner pressure tube 70 is coupled through the wall of the lower picking tube 14 into the closed chamber 88 via an elbow fitting and lock nut (see broken away area). Thus, FIG. 9 structurally shows pressure tube passages for control fluid continuity from the pressure tubes 68, 72 into the coiled tubes 69, 71, and tube passages for control fluid continuity leading from the pressure tube 70 into the closed chamber 88, while FIG. 10 shows the structural relationship between components in the upper end of the picking tubes. FIGS. 9 and 10 also show the upper and lower picking tubes 14, 16, the rigid tubes 85, 87 and the upper housing 96.

Structural details in cross-section as seen along a view plane just below the upper housing 96 are shown in FIG. 11. This view depicts the upper picking tube 16, the two pressure tubes 90, 92, the upper housing 96, and the mounting plate 102 that is secured to the upper end of the upper picking tube 16. A cross-sectional view taken along a view plane that passes through the center of the pressure tube 90 and through the upper housing 96 is included as FIG. 12 to show structurally the tube passage for control fluid continuity from the inside of the upper picking tube 16 through the mounting plate 102 to operatively connect with the fruit removing or harvesting mechanism 10. Pressure tube 90 bends and passes through the upper tube 16 and continues upwardly, but spaced from the upper tube 16, to and through the mounting plate 102. From there it connects to the in-port of the cutter actuator valve 108 (see FIG. 2B). Pressure tube 92 similarly exits from the upper tube 16 and passes through the mounting plate 102 but it connects into the sensor 112 (see FIG. 2B). It will be understood that since the actuator 108 and sensor 112 are positioned outside the support tube 100, which is structurally an extension of the upper picking tube 16, the pressure tubes 90, 92, exit therefrom in the area of the uppermost end of the picking means. The points of exit of pressure tubes 90, 92 will depend upon the location of the actuator valve 108 and sensor 112, and can be above or below the mounting plate 102 without departing from the spirit and scope of this invention. It is preferable, however, that a protective covering, such as upper housing 96, be included to protect the pressure tubes 90, 92, at their points of exit, and to prevent leaves, branches, or the like from "catching-on" to the tubes during use and causing damage that could break control fluid continuity to the fruit harvesting mechanism 10.

Figure 13:
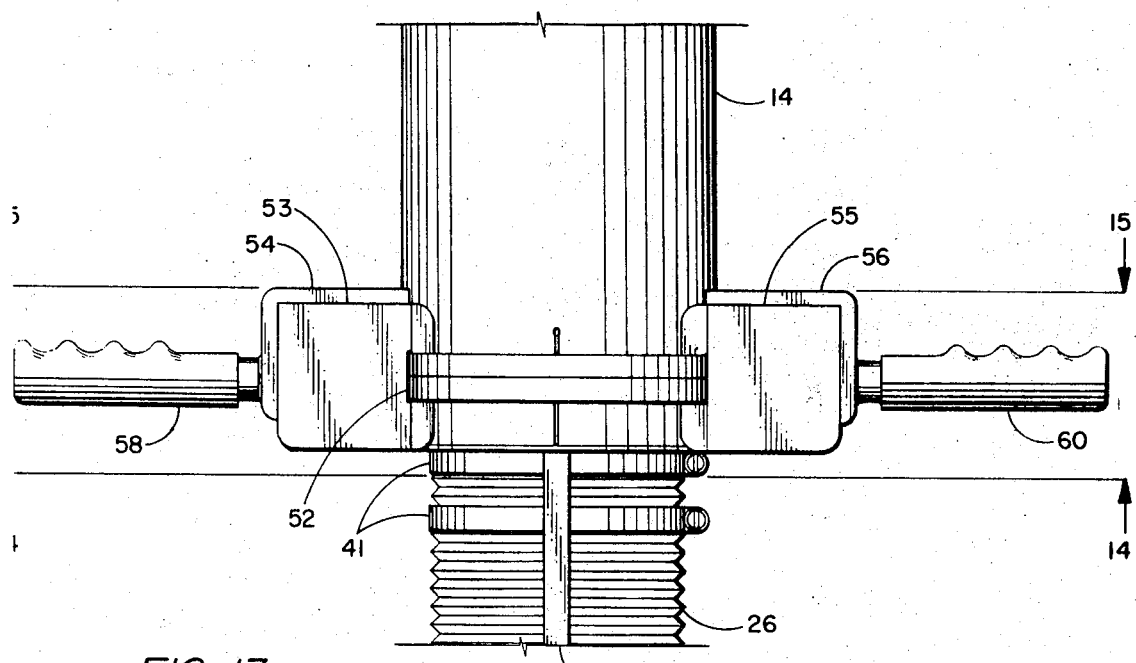
FIG. 13 is a top plan view of a preferred embodiment of a control mechanism for this invention showing "handle-bar" type handles.
Figure 14:
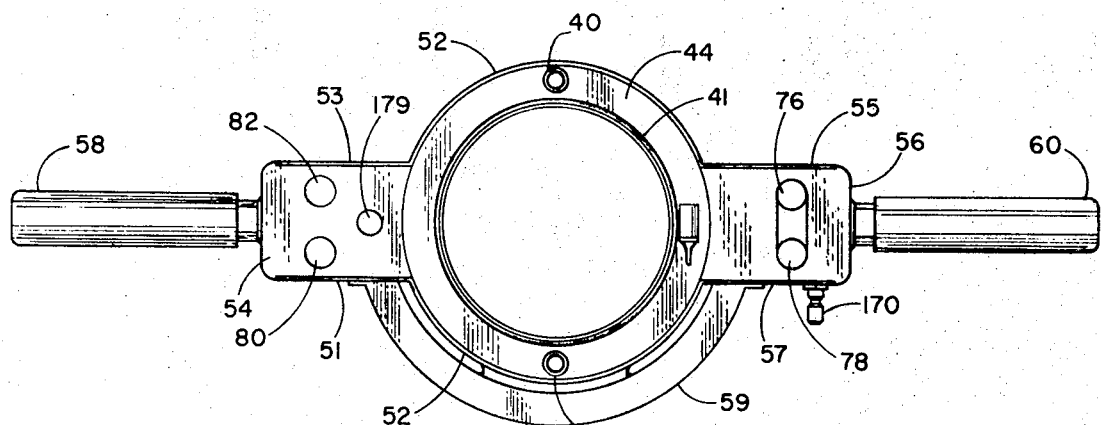
FIGS. 14 and 15 are end views of the "handle-bar" control mechanism respectively taken along the view planes 14—14 and 15—15 of FIG. 13.
Figure 15:
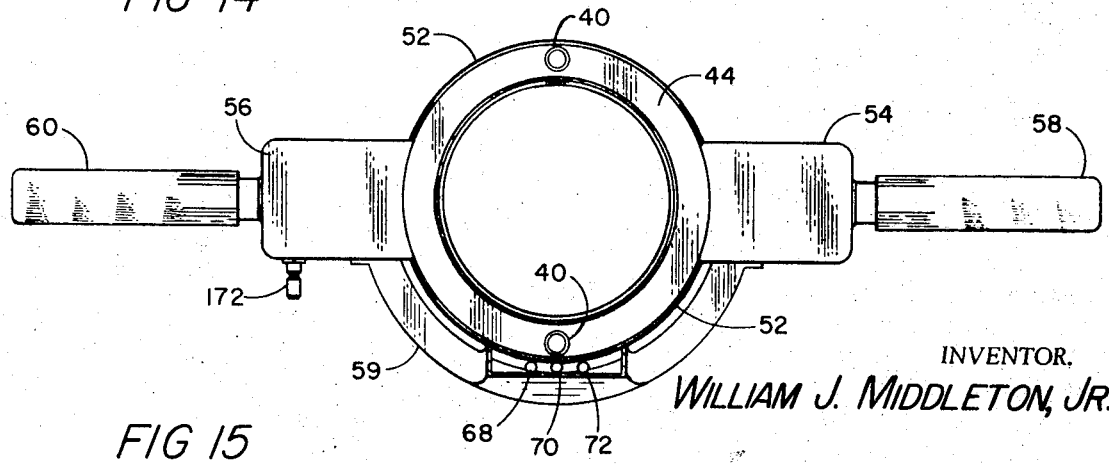

FIGS. 13–15 are respectively a top plan view as seen from above in FIG. 1 and front end and rear end views of the preferred control mechanism 18 above described when such is assembled and secured to the lower end of the extender mechanism 12.

Control boxes 54, 56 include respective upper covers 53, 55 and lower covers 51, 57 which, when in place, each have their forward and outer edges coterminous with and secured to the one side and base of the U-shaped portion of their respective control box, and their rear edge extending rearwardly beyond the other side of the U-shaped member. The inner edge of each plate or cover 51, 53, 55, 57, diverges beyond the ends of the sides of its respective U-shaped member and about the outer surface of the lower picking tube 14. A slot is provided in each of the plates through which the ring clamp 42 extends, such securing the control boxes 54, 56 in position about the lower picking tube 14. A curved cover 59 extends around the lower surface of the lower tube 14 between the control boxes 54, 56 for protecting their interconnecting pressure tubes 62, 64, 66. This cover has an opening through its upper end through which the pressure tubes 68, 70, 72 pass.

At the rear of the left control box 54 there are three openings: through the upper opening extends the RESET button 82; through the lower opening extends the OVERRIDE button 80; and through the inner opening extends the pressure adjustment knob 179 of pressure regulator 178. The rear of the right control box 56 has two openings with the UP button 76 extending through the upper opening and the DOWN button 78 extending through the lower opening.

Also shown in FIGS. 13–15 for graphic clarity are a portion of the transfer mechanism 26, ring clamps 41, the circular flat annular plate 44 of the tube adapter 42, control handles 58, 60, and the male connectors 170, 172 by which the pressure tubes 48, 50 are connected to the right control box 56.

It should be understood that the oppositely extending "handlebar" type arrangement of control mechanism 18 disclosed herein (see especially FIGS. 1, 2A and 13–15) are merely exemplary of one mechanical technique for providing readily accessible controls for the novel harvester. Other arrangements of this or other types of control mechanisms can be substituted without departing from the spirit and scope of this invention. For example, handles and the controls may be located "fore and aft" on the picking means 6 on either the top or bottom of the lower tube 14, or in a side-by-side position again on either the top or bottom of the lower tube 14. Basically, the control mechanism 18 delivers high and low pressures of control fluid to the harvester picking means on demand for UP and DOWN movements of the extender mechanism 10 on demand and for RESET and OVERRIDE modes of operation, and for automatically sensing presence of fruit and removing it by severing its stem when the fruit to be harvested is in a predetermined position relative to the harvesting mechanism.

Figure 16:
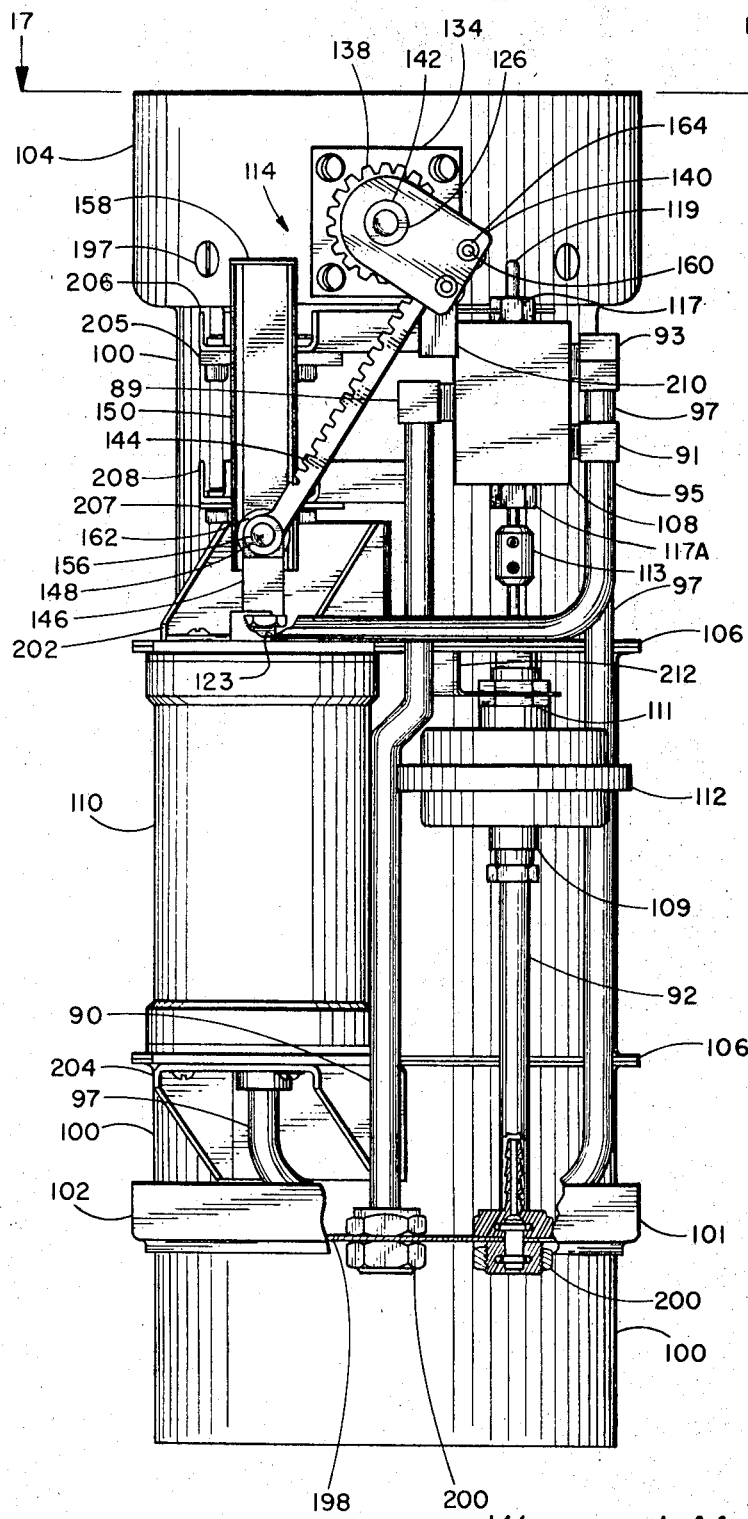
FIG. 16 is a plan view of a preferred embodiment of a fruit harvesting machanism for this invention with its protective cover removed for graphic representation purposes.

Referring now to FIG. 16 there is shown a bottom view of the fruit removing or harvesting mechanism 10 with the cover 168 removed, and with the mounting plate 102 secured to the lower end of the support tube 100, and with the cutter housing 104 secured to the upper end of support tube 100 by conventional screws 197. Intermediate the ends of the support tube 100 are two substantially equally spaced stiffener rings 106, such being either separate rings secured thereto by welding or the like, or flanged lip members formed from the adjacent peripheral ends of three cylindrical tubes making up support tube 100 and secured together by welding or the like. These stiffener rings 106 not only strengthen the support tube 100 but can also be used as support surfaces upon which various type brackets can be secured for supporting components of the fruit removing mechanism 10.

Extending through and being secured to the body 198 of the mounting plate 102, are the pressure tubes 90, 92 such being achieved by the use of two conventional barbed female fittings and seals 200. These fittings each include a barbed male end, an externally threaded male end and mating nut, a quick disconnect female opening in the threaded male end and a pair of internal O-rings for releasibly holding and sealing the quick disconnect male connectors (not shown) that are respectively secured to the pressure tubes 90, 92 at the point where they pass through the mounting plate 102. Extending from each of the barbed female fittings and seals 200 are the upper extensions of the pressure tubes 90, 92 with the pressure tube 90 being connected to the in-port of the cutter actuator valve 108 and the pressure tube 92 being connected to one end of the sensor 112. Mounting plate 102 also has a flanged portion 101 upon which the lower end of the cover 168 (see FIG. 2B) is secured, e.g., by screws or the like.

The air cylinder 110 is secured in position by the upper and lower right-angled brackets 202, 204, each of which has one of its faces secured to the support tube 100, e.g., welded thereto, and one of its faces secured to a respective end of the air cylinder 110, e.g., by screws or the like. Rack guide 150 is secured in position by the upper and lower guide brackets 206, 208, each of which are preferably welded to the upper end of the support tube 100. Mating brackets 205, 207 are secured to the base of the rack guide 150 and are respectively secured to the upper and lower guide brackets 206, 208 by two sets of nuts and bolts, for example. Another set of upper and lower valve and sensor brackets 210, 212 are secured to the support tube 100, with the upper valve bracket 210 securing in position the upper end of the actuator valve 108 and with the lower sensor bracket 212 securing in position the upper end of the sensor 112. The latter two brackets are sufficient to hold and secure in position the actuator valve 108 and sensor 112 because a rigid, firm connection is provided from the body portion 198 of mounting plate 102 through the bracket 212 to the bracket 210 via the following components; barbed fitting and seal 200, tube 92, lower sensor coupler fitting 109, sensor 112, upper sensor coupler fitting 111, connector link 113 joining the shaft of the sensor and the valve actuator rod, lower actuator fitting 117A, actuator valve 108, and upper actuator fitting 117.

Secured about the pivot axis of the cutter 118 are the cutter support plate 126 and its attached shaft, flanged support 134, pinion gear 138, lower rack retainer 140 and lower lock ring 142. Rack 144 has its one end between the rack retainers 136, 140, with its lower edge slidably engaging the retainer spacers 160 and its teeth interdigitated with the teeth on the pinion gear 138, and its other end secured to the rack clevis 146 and positioned within the rack guide 150.

To complete the control fluid circuit to the harvester mechanism, the two out-ports of the actuator valve 108 are respectively connected into the upper and lower ends of the air cylinder 110 via connector fittings 91, 93 and control fluid pressure tubes 95, 97.

A complete cycle of operation of the fruit harvesting mechanism 10 which servers the fruit stem when actuated will be set forth below. However, it should be noted at this point that when the lower end of the rack 144 travels up the rack guide 150 toward the end plate 158, the rack 144 drives the pinion gear 138 counter clockwise as seen in FIG. 16 about its axis and cams the rack retainers 136, 140 clockwise about their axis to a position in which their flat bottom edges are substantially perpendicular to the longitudinal axis of the support tube 100. During this movement of the rack 144 its bottom edge slidably engages the retainer spacers 160, while its unsecured end depresses the upwardly protruding diverter pin or rod 119 of the actuator valve 108 downwardly and reverses the direction of movement of the diverted shaft thereof. For the moment it will suffice to state that downward depressing of the diverter rod 119 commences the automatic reset operation of the fruit harvesting mechanism 10, by servo type action resetting valve 108 to non cut position.

Figure 17:
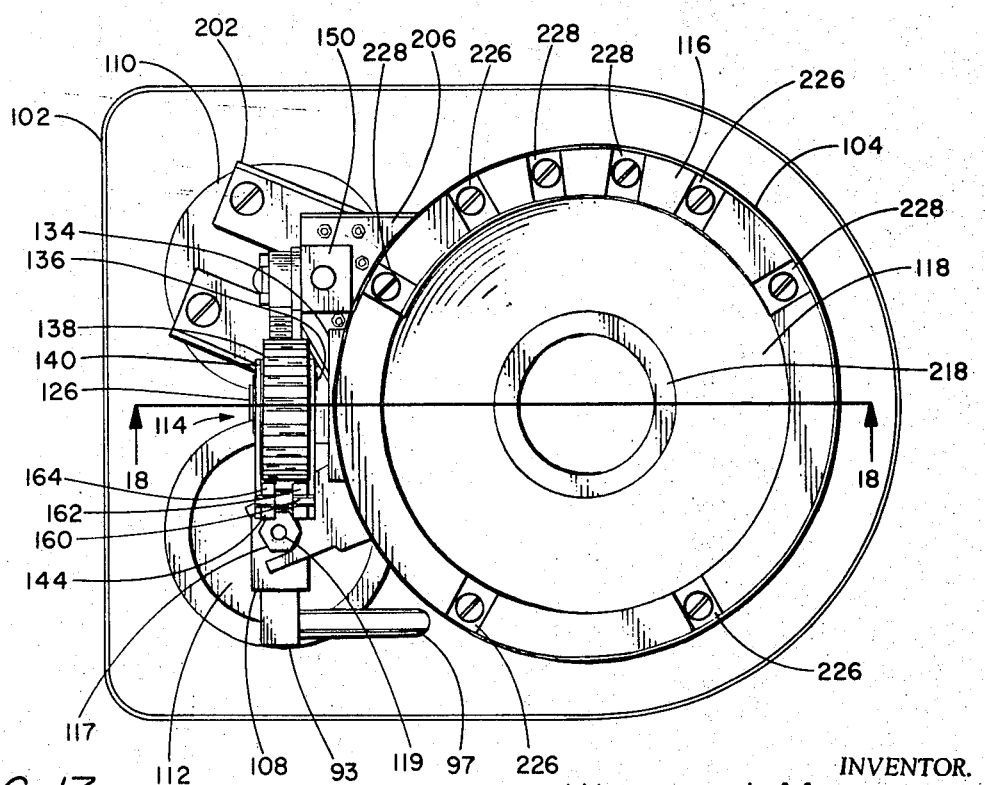
FIG. 17 is a top view of the fruit harvesting mechanism taken along the view plane 17—17 of FIG. 16.
Figure 19:
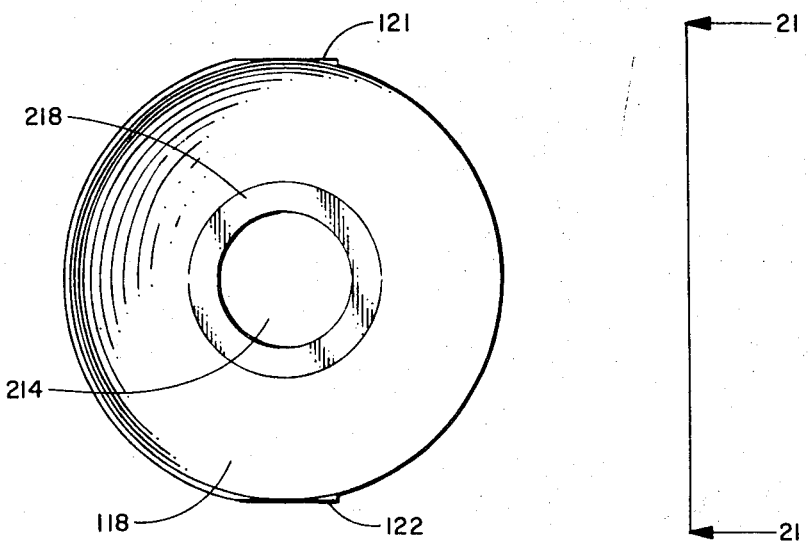
FIGS. 19, 20, and 21 are respectively top, side and end views of the preferred fruit removing device of this invention as shown in FIG. 18.
Figure 21:
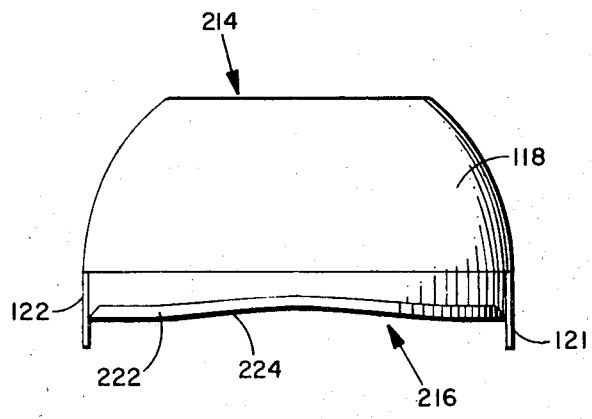

FIGS. 17 and 18, respectively show top and cross-sectional views of the upper, fruit removing portion of the harvesting mechanism 10 while FIGS. 19, 20, and 21 respectively show the top and two side views of the movable cutter cup 118 removed from the mechanism.

The one-piece cutter cup 118 is pivotally secured within and to the cutter housing 104 with its smaller opening 214 facing downwardly and with its larger opening 216 facing upwardly, the position ready for harvesting. The larger opening 216 should be slightly larger than the width of the fruit to be harvested while the smaller opening 214 should be slightly smaller than the width of the fruit to be harvested.

Upper ear member 122 of cutter 118 is secured to the upper cutter support plate 124, e.g., by a plurality of screws, and the shaft of the plate in turn is inserted through the upper bearing 128, such being held in position by the upper lock ring 130. On the other side of cutter cup 118, the lower ear member 121 thereof, a mirror image of its opposite ear member 122, is secured to the lower cutter support plate 126 which has its shaft portion inserted through the flanged support 134, inner or upper rack retainer 136, pinion gear 138, lower bearing 132, outer or lower rack retainer 140, such components being held in assembled position by the lower lock ring 142.

The lower bushing 115 is rigidly secured within the cutter housing 104 with its two curved notches facing upward, while the upper bushing 116 is secured within the cutter housing with its two curved notches facing downward. Respectively positioned within the two circular spaces defined by the two pairs of oppositely disposed curved notches of the lower and upper bushings 115, 116 are the bearings 128, 132, such being now pivotable within the two circular spaces. The upper and lower bushings 115, 116 are secured to each other by a plurality of screws 226. Stationary cutter 120 is positioned within a notch provided along the upper-inner edge of the upper bushing 116 and held therein by a plurality of screws 228.

A preferred cutter cup 118, as shown in FIGS. 19, 20 and 21, includes the ear members 121, 122, the smaller opening 214, the larger opening 216 and a resilient grommet 218 that overlaps the periphery of the smaller opening 214. Secured to the main body portion 220 of cutter cup 118 is an enlarged edge member 222 for cutting that extends between the ear members 121, 122 along about one-half of the periphery of the larger opening 216. Edge member 222 is preferably constructed from a material that will maintain a sharp edge, e.g., steel.

When the cutter cup rotates about its transverse axis through the ear member, the outer surface of the edge member 222, which is sharpened at periphery 224 just barely touches the inner edge of the stationary cutter 120, thus imparting a shearing or "scissor" type cutting action upon any object that is positioned therebetween, i.e., the stem of an article or piece of fruit to be harvested.

Figure 22:
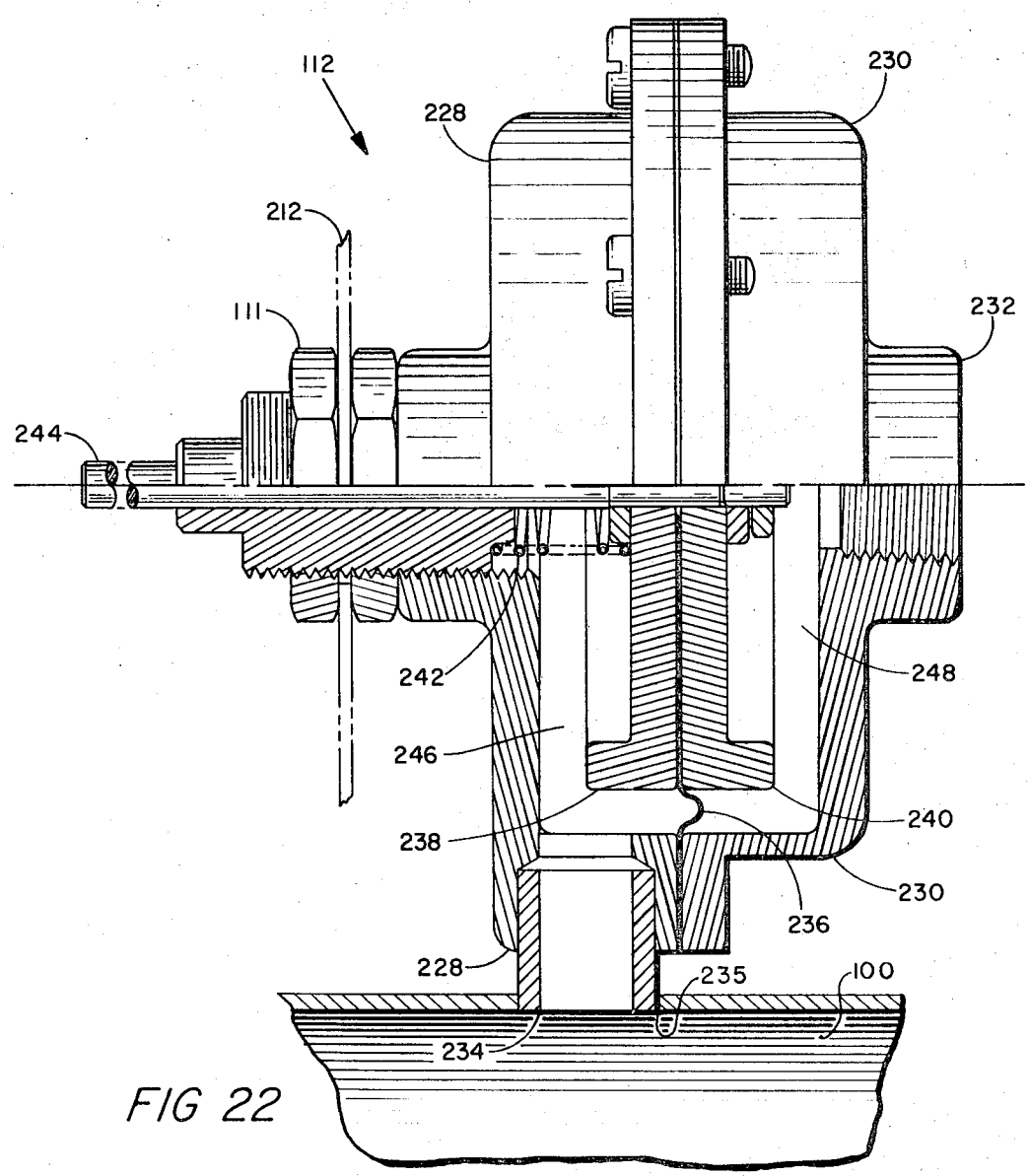
FIG. 22 is a plan view of a preferred embodiment of a condition sensing device for this invention with the lower portion cut away to expose a partial sectional view of the interior thereof.
Figure 30:
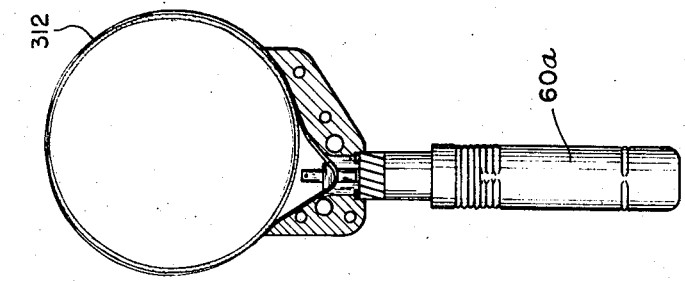
FIG. 30 is a cross-sectional view of the upper "in-line" control handle taken along the view plane 30—30 of FIG. 26.
Figure 29:
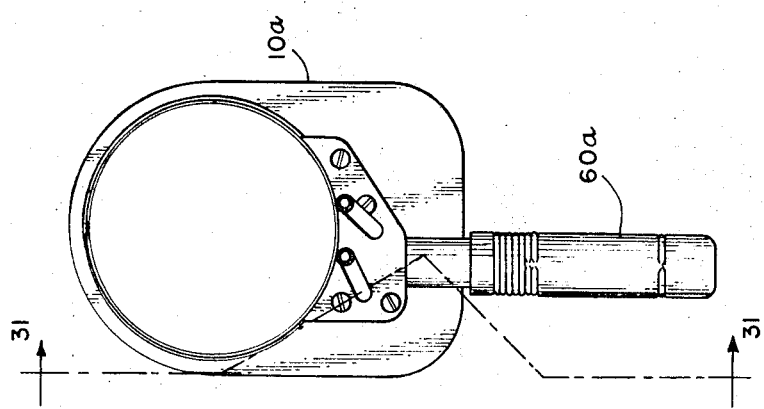
FIG. 29 is an upper cross-sectional and lower plan view of the upper "in-line" control handle taken along the view plane 29—29 of FIG. 26.
Figure 31:
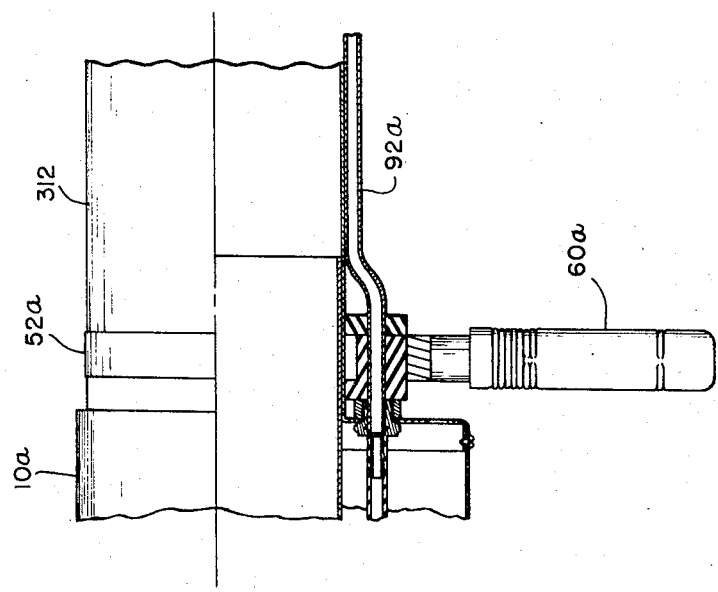
FIG. 31 is a cross-sectional view of the upper "in-line" control handle taken along the view plane 31—31 of FIG. 29.

In FIG. 22 an enlarged, partially cut-away view of the sensor 112 is shown which includes upper and lower housing members 228, 230, which are secured together by a plurality of screws and to bracket 212 by upper fitting 111, and also shows its in-port 232, pressure sensing means or test port 234, flexible diaphragm 236, diaphragm support plates 238, 240, equilibrium spring 242 and center shaft 244. Sensor 112 has two inner chambers 246, 248, one to the left of the flexible diaphragm 236 and one to the right.

When the nipple of the pressure test port 234 is positioned within and secured to communicate with the pressure test opening 235 defined through the wall of the support tube 100, and the pressure tube 92 is secured in communication with the in-port 232, and with the small opening 214 in the cutter cup 118 unblocked, sensor 112 is in equilibrium or balanced so that its center shaft 244 is retracted with little or no tension on the spring 242. The sensor is shown here with its diaphragm biased toward the right, thus indicating that the pressure in the upper chamber 246 is at least slightly higher than the pressure in the lower chamber 248.

When pressure in the upper chamber 246 drops below the pressure in the lower chamber 248, as would occur when the smaller opening 214 of cutter cup 118 is blocked by a piece of fruit to be harvested, or if the pressure in the lower chamber 248 rises above the pressure in the upper chamber 246, as would occur if intermediate fluid pressure were selectively coupled to the in-port 232 via the pressure tube 92, the suppport plates 238, 240, as well as the diaphragm 236, move upwardly against the equilibrium spring 242. This correspondingly drives the center shaft 244 upwardly and since this shaft is mechanically coupled to the diverter rod 119 of the actuator valve 108, selective application of control fluid pressure to the air cylinder 110, which actuates the cutter up through its piston and attached shaft 123 and the mechanism associated with rack 144, can be automatically achieved, i.e., the piston of the air cylinder can be fluidly driven upward, which effects cutting by actuating cup 118, or downward, to return the cup to non-cutting position, depending on the fluid programming which moves the diverter shaft or rod of the actuator valve 108.

When either the small opening 214 of the cutter cup 118 is unblocked or the fluid pressure in the pressure tube 92 returns to its normal value, the equilibrium spring 242 biases the support plates 238, 240 downwardly to the position shown in FIG. 22, thus mechanically moving the center shaft 244, connected therefor, downwardly and pulling the diverter rod of actuator valve 108 downwardly. This downward mechanical movement of the center shaft 244 selectively through its action on valve 108 applies fluid pressure to the air cylinder 110 and returns it to its normal non-cutting position, by pressurizing the upper portion of the cylinder reversing cup rotation.

Operation of the apparatus has been found satisfactory when the air moving device which may be an air pump or blower at the power source 34, draws air down through the picking head, and through the picking means tube or tubes in a volume and at a flow rate which produces a continuous static pneumatic vacuum in tube 100 of from about 15 to about 25 inches of water when the cutter cup opening 214 is unblocked, e.g. when no fruit is in the cup and blocking air flow through that opening; and from about 40 to 60 inches of water in tube 100 when the opening is blocked in which case pressure will be low enough to effect cutter operation and picking of the fruit which blocks the air flow.

FIGS. 23, 24, 25 respectively show a perspective view of the fruit discharge mechanism 28 and the foliage collector 32 with its access door partially removed; a bottom view taken along the view plane 24—24 of FIG. 23; and a cross-sectional view of the ensilage collector 32 taken along the view plane 25—25 of FIG. 23.

The fruit discharge mechanism 28 includes a cylindrical main body portion 250, and adapter tube 252 that has a lower cylinder flange 254 secured to the upper edge of the cylindrical body portion 250, a discharge tube 256 that has an upper cylinder flange 258 secured to the lower edge of the cylindrical body portion 250, and a connector tube 260 extending between and fluid coupling the main body portion 250 and the ensilage collector 32. Positioned in discharge tube 256 is a spring biased, normally closed, pivotable trap door 262 that is located near its upper end and pivoted about the transverse pin 264. Secured to the adapter tube 252 by two ring clamps 251 is the lower end of the transfer mechanism 26.

When a piece of harvested fruit that is vacuum propelled down the transfer mechanism 26 to the discharge mechanism 28 by the air flowing therethrough, reaches the trap door 262 its momentum overcomes the spring that holds the trap door 262 close and opens the trap door, and it then passes through the discharge tube 256 where it is collected into the fruit collector 30. However, because the mass of any foliage that may have been removed by the harvester is much lower than the mass of the harvested fruit, it follows flow produced by the air moving device or pump (not here shown), moving into the connector tube 260 and towards the ensilage collector 32.

The foliage collector 32 includes a main body portion 266, upper and lower covers 268, 269, an access door 270, an inner cylindrical tube 272 that has an outwardly flared upper flanged portion 274, and a circular screen 276 that is secured to the inner wall body portion 266 spaced below the upper cover 268 and resting upon the upper peripheral edge of the flanged portion 274. Thus, a donut shaped collector chamber 278 is provided that is defined by the inner walls of the body portion 266 lower cover 269, the outer walls of the cylindrical tube 272 and its flanged portion 274, and the outer circumferential edge area of the screen 276.

When foliage or stems are drawn into or forced down the foliage collector 32, they are trapped in the collector chamber 278 and prevented from traveling into the cylindrical tube 272 to which the air pump connects and which produces the air flow for low pressures or vacuum down through the picking means, transfer and discharge means and foliage collector. Such collected foliage can be readily removed from the collector chamber 278 through the access door 270.

FIGS. 26 through 31, in which letter a designates comparable parts to the foregoing embodiment, depict an alternate embodiment of a picking means 6a having an in-line type of control mechanism with a collecting or extender tube 312 that does not have a variable length capability. Attached to the inner end of the tube is the transfer tube or mechanism 26a and to the outer end of it, the picker head or fruit harvesting mechanism 10a. An outer and inner handle 60a, 58a are respectively attached to the extender tube by ring clamps 52a in an approximate alignment longitudinally along the tube. The clamps of the outer handle attach it by connection to its tube support portion and clamps of the inner handle connect to its control box 54a which in its essentials is similar to the left-hand control box 54 of FIGS. 1 and 2(a). Control box 54a has the male connection fittings 170a and 172a for connecting the high pressure tube 48 and control fluid low pressure or vacuum tube 50.

Manual cut (Override) and Reset control buttons 80a, 82a, are respectively positioned in control box 54a accessible to the operator's thumb when the handle 58a is gripped by the operator in use. Pressure tubes 90a, 92a, are respectively operatively connected from the controls in box 54a along the lower side of the extender tube, pass through the tube support portion of handle 60a and are connected into the harvesting mechanism picker head as in the embodiment heretofore described. Handle 60a thus serves in this instance only to support the picking means for elevation and azimuth control by the operator. However, it will be appreciated that control mechanisms as provided in the right-hand control box of FIG. 2(a) can be provided with capability for telescoping changes in length as heretofore described to provide an "in-line" control handle mechanism for a picking means having changeable length. Manual adjustment knob 179a provides for regulating the control fluid pressure by adjusting the setting of regulator 178, for speed changes.

FIG. 1(a) in which parts comparable to previously described embodiments are designated with a letter b, shows an embodiment of the invention wherein each one of a pair of picking means 6b, each having an automatically activated fruit removing or harvesting mechanism 10b can be strapped by bands onto an arm of the worker. Each picking means has an elongated collecting or support tube 100b to which the fruit transfer mechanism or tube 26b is attached. In the embodiment shown in the figure, the transfer mechanism has individual lead conduits leading from each support tube in the form of a yoke or Y connection into the main length of the transfer mechanism. Each lead conduit is led over a shoulder of the worker, which gives it support, and the transfer mechanism is further supported from a harness 314 worn by the worker using a cord attachment 316.

Each extender tube 312b, which is an extension of the support tube 100b, has a handle grip attached to it which provides the operator with means for grasping and manipulating the picking means and includes a control box 54b of similar construction to that described in connection with FIGS. 25 through 31, so that manual cut (Override) and Reset control buttons are accessible to the operator's thumb for control of the automatic harvesting mehanism. As is evident from FIG. 1A, with this invention a plurality of picking means for use by a plurality of operators can advantageously be operatively connected via plural transfer means or tubes 26b to the mobile power source 34b so as to provide fruit transfer and collection means in a fruit harvesting apparatus for the fruit which is harvested which can be conveniently moved through a grove as the operator-workers or pickers move along the rows of fruit trees.

Referring further to the control systems for operating the harvester apparatus, see particularly FIGS. 32 through 35, a continuous operation air blower (see FIG. 35) for moving air down through the picking means and creating the low static pressures therein is provided in association with the power source 34. Also located at the power source is a power pack unit which includes a combination compressor and vacuum pump 400 providing the pneumatic fluid pressure sources of control fluids. The blower and compressor-vacuum pump are operated from a preferably mobile energy or power source such as a Diesel engine (not shown) but may be operated by other means such as by electric motor connected to a remote source of electrical power.

The compressor/vacuum pump produces alternately as needed either high pressure or vacuum low pressure with the high pressure supplied into a pressure tank 402 and vacuum suction taken on a vacuum tank 404.

To place the harvester apparatus in readiness for picking fruit the engine is started and when it is up to operating speed a centrifugal clutch engages the compressor, and air is drawn in through the intake air filter 406 located ahead of a pressure vacuum transfer valve 408 and fills the pressure tank to about 110 to about 135 p.s.i.g. The compressor can alternately pump air to pressurize the pressure tank or produce control fluid vacuum low pressure in the vacuum tank of about .5 p.s.i.g. When tank 402 reaches the preset pressure, about 120 p.s.i.g., an unloading valve 407 operates so as to send an air pressure signal to compressor relief valve 408 which is an air operated, three-way valve or air pilot valve, thereby opening the output line from the compressor to the atmosphere. Simultaneously this air pressure signal is led to the pressure-vacuum transfer valve 410, moving the spool in it to shift the intake of the compressor from atmosphere so as to take suction on the vacuum tank. The compressor continues to take suction on the vacuum tank as long as there is a full head, say 120 p.s.i.g., on the pressure tank, or as long as there is maintained a preset pressure differential between the two tanks depending on the setting of the unloading valve.

In the case of the first embodiment described, the quick disconnects in lines 48, 50 lead respectively to male connectors 170, 172 (see FIGS. 14, 15) in order to respectively supply the extender tube control with vacuum, the clear or reset control with vacuum, and pressure to the controls for cutter actuation through its actuator valve, and for braking when the tube has a variable length capability and for pressure regulation.

When the picking means has the variable length extender mechanism, controls therefor can be arranged as in FIG. 33 wherein high and low (vacuum) pressure or control fluids are connected into the control system respectively from their sources (see connections at P and V in FIG. 32) through the pressure tubes and disconnects for tubes 48, 50 (see V and P at the top of FIG. 33). Pressure line or tube 48 divides at fitting 174 to supply control fluid high pressure to valve actuator 108 which in turn supplies this pressure when called for to air cylinder 110 operating the cutter cup 118. This high pressure is also supplied to the self-relieving pressure regulator 178 which is set to provide the intermediate or regulated low pressure of air to the Override or manual cut cycle valve 188 to DOWN valve 184. In addition, high pressure through line 48 is supplied through a 3-way brake valve 180 to the brake O-ring 196 via rigid or brake tube 85.

The vacuum low pressure tube or line 50 connects to the 3-way type clear or RESET valve 186 so as to provide a source of vacuum low pressure which is available to be supplied to the lower or back portion of the diaphragm in sensor 112 whenever the cutter cup action is to be reset or recycled which occurs when RESET button is depressed, thus manually overriding an incomplete cutting cycle condition.

It will be noted that a loop line 412 operably connects between valves 186 and 188 in a way to provide through line 192 for normally maintaining atmospheric pressure in the chamber 248 on the lower side of sensor 112. Thus, in an automatic fruit removing cycle of operation, when low pressure in the picking tubes snugs a fruit over the smaller opening or orifice-like aperture in the cup thereby lowering pressure in the collecting or picking tube, such lowered pressure is sensed or transmitted via port 234 in sensor chamber 246 above the diaphragm 236 which allows atmospheric pressure below it to move the support plates 238, 240 up against the spring carrying shaft 244 upward resulting in automatic rotation of cutter cup 118 to sever fruit as set out above. The automatic cycle is completed, returning cutter cup to normal fruit receiving position as the rotated cup with its smaller opening 214 now uppermost allows the severed fruit to fall or be sucked into the length of the collecting tube for conveying it to the collector, since pressure in the tube and in chamber 246 is thus increased so that spring 242 can aid in moving the diaphragm downward. This action, together with the impingement of the rack 144 on rod 119 to set the spool in valve 108 to non-cut position, releases air pressure to atmosphere from below the piston in cylinder 110 and pressurizes the other (upper) end of the cylinder above the piston which returns the piston to normal, lower position carrying rack 144 downward. This actuation reverses cutter cup rotation to bring the cup to its normal fruit receiving position with its larger opening 216 upward at the fruit seeking end of the picking or fruit harvesting and conveying means ready to receive another fruit.

It will be noted that loop line 412 also connects both the reset valve 186 and the manual cut or Override valve 188 with the required preset vacuum low pressure which can be operably connected through tube 92 into the lower or back side of the diaphragm in sensor 112.

Vacuum, e.g. low pressure at about .5 p.s.i.a., is also supplied via line 50 to the 3-way type UP valve 182 of the extender mechanism. A second loop line 414 connects between the UP and DOWN valves 182, 184 providing for selectively supplying intermediate low pressure or vacuum into the annular closed chamber 88, so as to operate the extender mechanism which thereby varies the length of the picking means depending on whether the UP or DOWN button is depressed by the operator. As indicated in broken lines in FIG. 33, operation of either the UP or DOWN valves also positions the brake valve, by depressing its actuator button 416 through plate 77 to release brake pressure, then to stop the telescoping of the tube in the desired position by applying brake pressure when the respective UP or DOWN button is released.

FIG. 34 depicts a modified control system providing for supplying high and low pressures to the picking means of the embodiments shown in FIGS. 1A and FIGS. 26 through 31 which do not have a variable length capability of the extender tube or mechanism. Comparable parts in FIG. 34 to parts in FIG. 33 are designated by letter $b$, and which correspond to parts $a$ in FIGS. 26 to 31. The action of the controls in FIG. 34 also is comparable to that of FIG. 33 controls except that valves and lines to effect up, down and brake action are not included.

Thus, the high pressure line 48 in these embodiments connects as before via line 90 or 90$a$ to the actuator valve 108 and also supplies pressure to the pressure regulator 178$b$ which provides the proper intermediate low pressure to the 3-way type control Override valve 188$b$ so when its actuator or button 80$b$ is depressed by the operator the cutter cup 118 will be revolved to its cutting position. Vacuum low pressure is led from line 50 to the 3-way control type reset valve 186$b$ and through it to pressure tube 92 or 92$a$ leading to sensor 112. Also, a loop connection line 412$b$ connects between Reset valve 186$b$ and Override (manual cut) valve 188$b$, so that Reset valve 186$b$ is normally open to atmosphere through Override valve 188$b$ but when the recycle or reset control button 82$b$ is depressed, vacuum low pressure will be supplied to the sensor 112 through the line designated $a$ and the connection to atmosphere will be closed which acts to return the cutter cup 118 to normal or non-cutting position.

The control fluid or pneumatic operating pressure portion of the operating mechanism portions of the harvesting mechanism or picker head is indicated in FIG. 35 wherein high pressure is supplied through line 90 to the valve actuator 108, whose operation is shown by diagram symbol, and intermediate low pressure or vacuum low pressure is supplied through line 92 to the lower side of the diaphragm in sensor 112 as heretofore set out.

Connection to test port 234 from the upper side of the diaphragm is also shown, and the mechanical actuation portions as far as the rack drive mechanism is indicated in broken lines. These are the shaft connection through link 113, whereby the sensor actuates valve 108, the piston in cylinder 110 and its shaft which drives the rack, and which effects the valve resetting action occurring when the rack is driven by action of the air cylinder mechanism.

It will be appreciated that the apparatus of this invention can be a multiple unit with many picking heads operating from a portable base so that the pickers can conveniently move about in the harvest field during the picking operation. For example, the power source, pressure, vacuum and the air moving equipment together with the foliage and fruit collector or receiving portions of the apparatus can be mounted on a self-mobile or other wheeled frame for most advantageously positioning the parts of the apparatus for use with respect to the operators and growth source of the fruit to be picked. To accomplish this a plurality of the hoses or transfer mechanisms can be operatively connected into such a portable arrangement of the apparatus. In this arrangement, each hose has one or more associated fruit picking means as described, so that a number of users or pickers simultaneously can pick fruit with the picking means powered for automatic fruit removal from a single more or less central location to a crew of the pickers which provides them with wide ranging movement and provides drawing of the fruit picked to a fruit collecting location central to the crew for economies of operation.

It will be appreciated that the fruit harvester of this invention provides for a quick and easy removal of fruit from its growth source by the pneumatic sensing mechanism within the picking head. Any form of pneumatic sensing means that is responsive to the presence of fruit in the picking head may be used to actuate the means for disengaging the fruit from its growth source and is within the purview of this invention.

What is claimed is:

1. A fruit harvesting apparatus for automatically removing fruit from its growth source comprising:
    (a) a fruit harvesting and conveying means, said harvesting and conveying means being capable of maintaining a vacuum therein and having a fruit seeking end open to the atmosphere;
    (b) a fruit receiving means positioned in said fruit seeking end capable of receiving fruit positioned in it by the aid of the vacuum in said harvesting and conveying means and capable of causing the lowering of the pressure in said harvesting and conveying means when said fruit is so positioned;
    (c) means for actuating said fruit receiving means to remove fruit from its growth source and when removed to permit it to pass through said harvesting and conveying means and then to return the fruit receiving means to its normal position; and
    (d) means for sensing a drop in pressure positioned in said fruit harvesting and conveying means, operatively connected to said actuating means for causing operation of said actuating means when a pressure drop is produced in said fruit harvesting and conveying means by the positioning of fruit in said receiving means.

2. The apparatus of claim 1 in which said fruit receiving means is a rotatable member having an orifice therein so that fruit received in said member causes the lowering of the pressure in said harvesting and conveying means and rotation of the fruit receiving means rotates the fruit bringing lateral pressure on the stem of it at the point of abscission to remove it from its attachment to its growth source.

3. The apparatus of claim 1 in which said vacuum is produced by an air blower operatively connected to said fruit harvesting and conveying means.

4. The apparatus of claim 1 in which said sensing device is mechanically operated.

5. The apparatus of claim 1 in which said sensing device is pneumatically operated.

6. The apparatus of claim 1 in which said sensing device is balanced by mechanical and pneumatic forces when said fruit receiving means is in its normal position and is unbalanced when a presure drop is produced to effect an actuation of the fruit receiving means.

7. The apparatus of claim 1 in which said means for actuating said receiving means is energized by fluid pressure.

8. The apparatus of claim 1 in which said means for actuating said receiving means is energized by pneumatic pressure.

9. The apparatus of claim 8 in which said actuating means has operatively connected to it air cylinder means and valve means so that on operation of said sensing means in response to pressure drop in said harvesting and conveying means the valve means provide pneumatic pressure to the air cylinder to produce actuation of the said receiving means.

10. The apparatus of claim 1 in which said means for actuating said receiving means is energized by multiple pressures.

11. The apparatus of claim 1 in which said means for actuating said receiving means has an automatic reset means for effecting the return of said fruit receiving means to its normal fruit receiving position.

12. The apparatus of claim 11 in which said re-set means contains rack and pinion members which effect an automatic re-set at the end of the rack stroke to return the fruit receiving means to its normal fruit receiving position.

13. The apparatus of claim 11 in which supra-atmospheric pressure is released to operate said fruit receiving means to said fruit removal position when a pressure drop is detected in said harvesting and conveying means and when said fruit is passed into said harvesting and conveying means said reset means causes a release of said supra-atmospheric pressure thereby returning said fruit receiving means to its normal fruit receiving position.

14. The apparatus of claim 1 in which said means for actuating said receiving means is electrically operated.

15. The apparatus of claim 1 in which said reset means is electrically operated.

16. The apparatus of claim 1 in which said fruit harvesting and conveying means has a telescoping tube arrangement in it and means for extending and contracting the harvesting and conveying means to place said fruit seeking end in position to harvest fruit.

17. The apparatus of claim 16 in which said means for extending and contacting said harvesting and conveying means is fluid operated.

18. The apparatus of claim 16 in which said means for extending and contracting said harvesting means is pneumatically operated.

19. The apparatus of claim 16 in which one or more handle means are operatively connected to said means for extending and contracting the said telescoping tube arrangement for manipulating the fruit seeking end of said harvesting and conveying means in elevation and azimuth.

20. The apparatus of claim 16 in which manual control means are operatively connected to at least one of the handles located at the harvesting and conveying means for manually controlling the extension and contraction of said harvesting and conveying means.

21. The apparatus of claim 20 in which said manual control means are operatively connected to said fruit recurring means to manually control its operation.

22. The apparatus of claim 21 in which said manual control means is a fluid valve arrangement.

23. The apparatus of claim 16 in which the said telescoping tube arrangement includes a variable volume annular chamber between inner and outer telescoping tubes for receiving and maintaining a selected fluid pressure to effect a change in volume of the said chamber for extending or contracting the effective length of the telescoping tubes.

24. The apparatus of claim 23 in which said means for extending and contracting the telescoping tubes are pneumatic valves having means under control of a field workman which can be selectively operated to supply either a source of supra-atmospheric pressure or a source of sub-atmospheric pressure into the said chamber on demand for effecting the said volumetric change thereof for respectively contracting or extending the tube length.

25. The apparatus of claim 23 in which the said selected fluid pressure is adjustable to vary the speed of extending or contracting.

26. The apparatus of claim 24 in which the control means for operation of the said valves are self-repositioning push buttons.

27. The apparatus of claim 23 in which a reduced volume of the said annular chamber is effective to increase the effective length of the telescoping tube arrangement.

28. The apparatus of claim 23 in which an increase in volume of the said annular chamber is effective to decrease the effective length of the telescoping tube arrangement.

29. The apparatus of claim 16 in which brake means are provided for stopping and holding the telescoping tube arrangement in extended or contracted position.

30. The apparatus of claim 29 in which the means for stopping and holding the telescoping tube arrangement is a brake device which can be tightly engaged against at least one of the tubes when actuated by pneumatic pressure.

31. The apparatus of claim 30 in which the brake device is an O-ring.

32. The apparatus of claim 30 in which the brake means is automatically released from right engagement holding the telescoping tube arrangement in selected position when the said means for extending or contracting the effective length of the tubes is actuated to change the length and is tightly re-engaged when not so actuated.

33. The apparatus of claim 1 in which a multiple number of fruit harvesting and conveying means are positioned on a vehicle means with a central pneumatic power source, collector mechanism for the fruit being harvested, and foliage collector.

34. The apparatus of claim 1 in which said fruit harvesting and conveying means has means for mounting a fruit receiving means on at least one of the ha onfsd ff, fruit receiving means on at least one of the hands of a field workman so that the workman can by hand place a fruit seeking end in position to harvest the fruit.

35. The apparatus of claim 1 in which the fruit harvested is citrus fruit.

36. The apparatus of claim 1 in which the fruit harvested is separated from its field growth applying lateral pressure on the stem during actuation of said fruit receiving means to effect an abscission parting of the stem from the body of the fruit.

37. The apparatus of claim 1 in which said harvesting and conveying means is supportable for universal pivoting movement by a harness means worn by a field workman to control the positioning of said fruit seeking end.

38. The apparatus of claim 1 in which said fruit harvesting and conveying means has a foliage collector operatively connected thereto for removing stems and leaves that pass through the harvesting and conveying means in the harvesting of the fruit.

39. The apparatus of claim 1 in which said fruit harvesting apparatus has manual control means thereon for manually operating the actuation of said fruit receiving means.

40. The apparatus of claim 1 in which said vacuum is continuously maintained by a blower means in said harvesting and conveying means.

41. A fruit harvesting apparatus for automatically removing fruit from its growth source comprising:
(a) a fruit harvesting and conveying means, said harvesting and conveying means being capable of maintaining a vacuum therein and having a fruit seeking end open to the atmosphere;
(b) a rotatable fruit receiving means positioned in said fruit seeking end capable of receiving fruit positioned in it by the aid of the vacuum in said harvesting and conveying means and capable of causing the lowering of the pressure in said harvesting and conveying means when said fruit is so positioned;
(c) means for aiding the removal of said fruit from its growth source when said fruit receiving means is rotated;
(d) actuating means for rotating said receiving means to cause removal of the fruit from its growth source and to allow the fruit when removed to pass into said harvesting and conveying means and thereafter to return the fruit receiving means to its normal position; and
(e) means for sensing a drop in pressure positioned in said fruit harvesting and conveying means operatively connected to said actuating means for causing the operation thereof which rotates said receiving means when a pressure drop is produced in said fruit harvesting and conveying means by the positioning of fruit in said receiving means.

42. The apparatus of claim 41 in which said sensing means includes a diaphragm means operatively connected to said actuating means for controlling the rotation of said fruit receiving means to a fruit removal position and its return to its normal position.

43. The apparatus of claim 41 in which said rotatable fruit receiving means is a semi-spherical member having means therein for the passage of air into said harvesting and conveying means until fruit is positioned in it and rotatable for substantially 180° to effect a removal of the fruit from its growth source and to pass the removed fruit into the harvesting and conveying means.

44. The apparatus of claim 41 in which said means for aiding the removal of fruit from its growth source is a cutter means positioned in said rotatable fruit receiving means so that rotation of said fruit receiving means causes stem severance if abcission removal is not accomplished.

45. The apparatus of claim 41 in which said means for aiding the removal of fruit from its growth source is a cutter means positioned in an edge of the fruit seeking open end of said harvesting and conveying means so that rotation of said fruit receiving means causes stem severance if abcission removal is not accomplished.

46. The apparatus of claim 41 in which the actuating means for rotating the receiving means is fluid pressure energized to return the fruit receiving means to its normal position for receiving fruit when fruit is passed into said harvesting and conveying means.

47. The apparatus of claim 46 in which said fluid pressure is a liquid.

48. The apparatus of claim 46 in which said fluid pressure is a gas.

49. The apparatus of claim 46 in which said fluid pressure is air.

50. The apparatus of claim 41 in which said rotatable fruit receiving means is a split cup-like member defining an orifice therein so that fruit received in said split cup-like member causes the lowering of the pressure in said harvesting and conveying means.

References Cited

UNITED STATES PATENTS

| | | | |
|---|---|---|---|
| 2,499,037 | 2/1950 | Roles | 56—328X |
| 2,545,072 | 3/1951 | Denman | 56—332 |
| 2,775,088 | 12/1956 | Bullock | 56—332 |
| 2,968,907 | 1/1961 | Bernheim et al. | 56—332 |
| 3,200,575 | 8/1965 | Hurst | 56—328 |
| 3,306,019 | 2/1967 | MacCurdy | 56—332 |
| 3,460,330 | 8/1969 | Black, Jr. | 56—328 |
| 3,468,110 | 9/1969 | Newman | 56—328 |
| 3,473,312 | 10/1969 | Holt | 56—332 |

RUSSELL R. KINSEY, Primary Examiner